US011162014B2

United States Patent
Jones et al.

(10) Patent No.: US 11,162,014 B2
(45) Date of Patent: Nov. 2, 2021

(54) ACCELERATING AGENTS FOR RESIN CEMENT COMPOSITE SYSTEMS FOR OIL WELL CEMENTING

(71) Applicant: Halliburton Energy Services, Inc., Houston, TX (US)

(72) Inventors: Paul Joseph Jones, Houston, TX (US); William Cecil Pearl, Jr., Spring, TX (US); Samuel Jason Lewis, The Woodlands, TX (US); Thomas Jason Pisklak, Cypress, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/483,727

(22) PCT Filed: Sep. 7, 2018

(86) PCT No.: PCT/US2018/050006
§ 371 (c)(1),
(2) Date: Aug. 5, 2019

(87) PCT Pub. No.: WO2020/050857
PCT Pub. Date: Mar. 12, 2020

(65) Prior Publication Data
US 2020/0362222 A1    Nov. 19, 2020

(51) Int. Cl.
*C09K 8/467*     (2006.01)
*C04B 24/02*     (2006.01)
*C04B 28/24*     (2006.01)

(52) U.S. Cl.
CPC .............. *C09K 8/467* (2013.01); *C04B 24/02* (2013.01); *C04B 28/24* (2013.01)

(58) Field of Classification Search
CPC ... C09K 8/42; C09K 8/44; C09K 8/46; C09K 8/467; C09K 8/493; E21B 33/13
See application file for complete search history.

(56) References Cited

U.S. PATENT DOCUMENTS

| | | | | |
|---|---|---|---|---|
| 2,512,716 | A | * | 6/1950 | Courtney ................ C04B 28/02 524/6 |
| 2,865,876 | A | * | 12/1958 | Scott, Jr. ................. C04B 24/22 524/8 |
| 3,310,511 | A | * | 3/1967 | Reinert ................... C08L 63/00 523/401 |

(Continued)

FOREIGN PATENT DOCUMENTS

| WO | 2000041981 | 7/2000 |
|---|---|---|
| WO | 2012004568 | 1/2012 |

OTHER PUBLICATIONS

ISRWO International Search Report and Written Opinion for PCT/US2018/050006 dated May 29, 2019.

*Primary Examiner* — Angela M DiTrani Leff
(74) *Attorney, Agent, or Firm* — Thomas Rooney; C. Tumey Law Group PLLC

(57) ABSTRACT

A method of cementing may comprise: providing a bulk dry cement, wherein the bulk dry cement comprises a dry blend of cement and a solid resin accelerator, wherein the solid resin accelerator comprises a liquid resin accelerator on a solid particle; preparing a cement slurry comprising: the bulk dry cement; water; and a liquid hardenable resin component; and introducing the cement slurry into a wellbore.

20 Claims, 9 Drawing Sheets

(56) References Cited

U.S. PATENT DOCUMENTS

| | | | |
|---|---|---|---|
| 3,988,279 A * | 10/1976 | Klassen | C04B 28/04 |
| | | | 523/401 |
| 5,322,562 A | 6/1994 | Ellenberger et al. | |
| 5,368,102 A * | 11/1994 | Dewprashad | C08G 59/18 |
| | | | 166/276 |
| 6,244,344 B1 | 6/2001 | Chatterji et al. | |
| 6,350,309 B2 * | 2/2002 | Chatterji | C04B 24/18 |
| | | | 106/677 |
| 7,407,010 B2 * | 8/2008 | Rickman | C09K 8/64 |
| | | | 166/295 |
| 7,762,329 B1 * | 7/2010 | Morgan | C09K 8/426 |
| | | | 166/295 |
| 8,689,873 B2 | 4/2014 | Abad et al. | |
| 2003/0188669 A1 | 10/2003 | Sobolev et al. | |
| 2012/0325476 A1 * | 12/2012 | Brenneis | C04B 28/021 |
| | | | 166/292 |
| 2014/0162910 A1 * | 6/2014 | Braley | C09K 8/516 |
| | | | 507/120 |
| 2016/0084037 A1 * | 3/2016 | Brothers | C04B 28/02 |
| | | | 166/292 |
| 2016/0194544 A1 * | 7/2016 | Jones | E21B 33/14 |
| | | | 166/295 |
| 2017/0137690 A1 | 5/2017 | Grinrod | |
| 2017/0167223 A1 * | 6/2017 | James | C09K 8/467 |
| 2020/0024508 A1 * | 1/2020 | Xu | E21B 37/06 |

\* cited by examiner

ACCELERATING AGENTS FOR RESIN CEMENT COMPOSITE SYSTEMS FOR OIL WELL CEMENTING

BACKGROUND

Cement compositions may be used in a variety of subterranean applications. For example, in subterranean well construction, a conduit (e.g., pipe string, casing, liners, expandable tubulars, etc.) may be run into a well bore and cemented in place. The process of cementing the pipe string in place is commonly referred to as "primary cementing." In a typical primary-cementing method, a cement composition may be pumped into an annulus between the walls of the well bore and the exterior surface of the pipe string disposed therein. The cement composition may set in the annular space, thereby forming an annular sheath of hardened, substantially impermeable seal (i.e., a cement sheath) that may support and position the pipe string in the well bore and may bond the exterior surface of the pipe string to the subterranean formation or the inside of a larger conduit. Among other things, the cement sheath surrounding the pipe string functions to prevent the migration of fluids in the annulus, as well as protecting the pipe string from corrosion. Cement compositions also may be used in remedial-cementing methods, for example, to seal voids in pipe strings or cement sheaths, to seal highly permeable formation zones or fractures, to place a cement plug, and the like. As used herein the term "void" refers to any type of space, including fractures, holes, cracks, channels, spaces, and the like. Such voids may include: holes or cracks in the pipe strings; holes, cracks, spaces, or channels in the sheath; and very small spaces (commonly referred to as "micro-annuli") between the interior surface of the cement sheath and the exterior surface of the conduit or between the outer surface of the cement sheath and the formation or inside surface of a larger conduit. Sealing such voids may prevent the undesired flow of fluids (e.g., oil, gas, water, etc.) and/or fine solids into, or from, the well bore. Cement compositions also may be used in surface applications, for example, construction cementing.

Cement compositions comprising resin have been used in primary and remedial cementing to impart desirable properties to the sealant composition. Cement compositions comprising resin may typically comprise a liquid hardenable resin, a liquid hardening agent, a liquid hardening accelerator, and a cement. Cement compositions comprising resin may have increased flexibility and toughness as compared to conventional cement compositions. Cement compositions comprising resin may be used, for example, in applications where increased stresses and/or increased number of stress cycles may be encountered. For example, cement compositions comprising resin may have applicability in cementing methods performed in shale formations as wells drilled in these types of formations may require multiple fracturing stages requiring the sealant compositions to have sufficient flexibility and toughness to withstand repeated hydraulic stress and thermal cycles. In addition, cement compositions comprising resin may also be placed into the well bore to plug a void in the conduit (e.g., the pipe string) or cement sheath or a void that may have formed between the cement sheath and a wall of the well bore or the conduit.

However, cement compositions comprising resin may have several drawbacks to their use in wellbore applications, including difficulty in mixing the components of the resin, for example. Typically, the liquid resin components (e.g. liquid hardenable resin, liquid hardening agent, and liquid hardening accelerator) may be mixed in a mixer such as a batch mixer or equivalent mixing vessel prior to mixing with a cement slurry comprising to form the cement slurry comprising resin. Thereafter, the cement slurry comprising the resin may then be pumped into an annulus in the case of primary cementing or a void in the case of remedial cementing. The mixing step before addition to the cement slurry may be required to ensure the liquid resin components are well mixed and mixed in the correct ratios. The liquid resin components may require mixing to ensure the required mechanical properties of the cured resin are achieved.

Mixing the liquid resin components may present a bottleneck in the cementing process as the mixer may be of a finite size and volumetric flow rate. The mixer may require time to mix the liquid resin components whereas a cement slurry may be mixed "on the fly" in a continuous operation. As discussed above, the liquid resin components may generally require complete mixing in correct ratios to cure with desired mechanical properties. As such, the mixing of cement slurry, i.e. mixing the dry components of the cement slurry with water, may be relatively quick compared to the batch mixing associated with mixing the liquid resin components. Consequently, continuous addition of resin, "on the fly," to a cement slurry may not be possible without complex piping and multiple resin mixers. Such operations may become cost prohibitive due to excessive equipment costs and complexity. In offshore applications with limited available space, multiple resin mixers may not be physically able to fit within a cementing skid. Resin mixers may also present a failure point for the cementing operations. Should mechanical issues arise with the resin mixer, the cementing operation may be compromised. In applications where more resin than the mixer is capable of delivering is required, the cementing operation may need to be halted to mix more resin thereby increasing time and cost associated with the cementing operation. Furthermore, material handling for cementing operations may become more complex when multiple storage totes or containers for the liquid resin components must be brought to the wellsite.

BRIEF DESCRIPTION OF THE DRAWINGS

These drawings illustrate certain aspects of some of the embodiments of the present disclosure, and should not be used to limit or define the disclosure.

DETAILED DESCRIPTION

The present disclosure may relate to resin containing cement compositions and, more particularly, in certain embodiments, to resin containing cement compositions wherein the resin comprises a solid resin accelerator and liquid hardenable resin and associated methods of use in servicing well bores.

Figure 1:
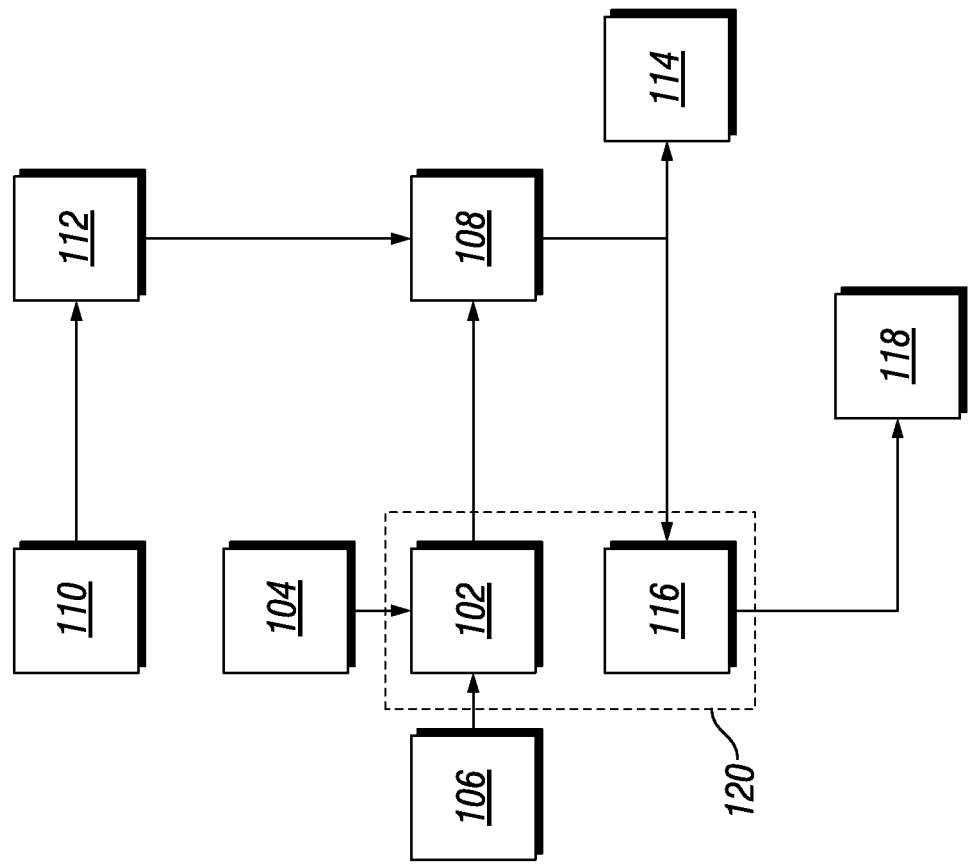
FIG. 1 is a block diagram of a cementing system configured to mix a cement and resin where the resin components are liquids.

FIG. 1 illustrates exemplary cementing system 100 which is configured to blend a resin containing cement composition where each component of the resin is a liquid. The components of the resin may comprise liquid hardenable resin, liquid hardening agent, and liquid hardening accelerator, for example. Cementing system 100 may be exemplary of a typical wellbore cement system configured to mix cements comprising resin where each component of the resin is a liquid. Cement mixer 102 may be coupled to cement source 104 and water source 106 such that bulk cement from cement source 104 and water from water source 106 may be metered into cement mixer 102. Cement mixer 102 may comprise any kind of cement mixer suitable for mixing cements for oilfield applications such as, without limitation, a recirculating cement mixer, batch mixer, hydraulic jet mixer, or any other cement mixer known in the art. Cement mixer 102 may comprise all equipment required to mix a cement suitable for use in a well bore including, but not limited to, pumps, manifolds, control systems, tanks, valves, flowmeters, densometers, agitators and any other equipment well known in the art. Cement mixer 102 may mix a cement slurry appropriate for a particular application by, for example, metering water and bulk cement into a mixing tub to produce a cement slurry with a desired density. Cement mixer 102 may also comprise liquid additive pumps and solids handling systems for adding one or more additional cement additives to the cement slurry. Cement source 104 may be any appropriate source of bulk cement such as for example, a cement storage trailer comprising bulk storage tanks containing cement. The cement may be of any type as will be described in detail below. Water source 106 may comprise any water source such as water tanks, water trailer, and other sources of water known in the art.

With continued reference to FIG. 1, resin source 110 may comprise totes, tanks, containers, and the like suitable for storing liquid resin components. Liquid resin components may comprise, without limitation, liquid hardenable resin, liquid hardening agent, liquid accelerator, and other components required to produce a resin with the desired mechanical properties. Resin components from resin source 110 may be metered into resin mixer 112 by a liquid additive pump, for example, and mixed to form the resin as previously described. Resin mixer 112 may be any suitable mixer for mixing the resin, including, without limitation, mixing totes, a bulk mixer, a recirculating mixer, or any other mixer appropriate to mix the resin. Cement slurry from cement mixer 102 and resin from resin mixer 112 may be pumped to mixer 108 (e.g., a batch mixer) where the cement slurry and resin may be mixed to form a resin containing cement composition. The resin may be added to mixer 108 by a liquid additive pump, for example, to ensure proper amounts of resin are added to the cement slurry. Mixer 108 may thoroughly combine the resin and cement slurry such that the resultant cement composition comprises the desirable properties such as strength and ductility, for example. Resin containing cement composition from mixer 108 may be pumped to cementing pump 116. Cementing pump 116 may pressurize the resin containing cement composition such that the resin containing cement composition can be introduced into wellbore 118. Emergency discharge tank 114 may be provided in case of equipment failure or other adverse conditions occur during the cementing operation to provide a safe method to dispose of the cement composition. In some examples, cementing pump 116 and cement mixer 102 may be disposed on a skid 120. Skid 120 may be a free standing skid for offshore operations or for land based cementing operations, skid 120 may be part of a mobile cementing unit such as a cement truck, for example.

As previously discussed, conventional methods of using resins with liquid components in cementing applications may require multiple mixers and other cementing equipment which may increase cost and complexity of cementing operations. Generally, the additional mixers and equipment may not be part of a cementing skid and therefore must be brought to a wellsite as auxiliary equipment separate from the main cementing mixers and pumps. Additionally, conventional methods may require the use of multiple chemicals including a liquid hardenable resin, liquid hardening agent, and liquid hardening accelerator to achieve desired mechanical properties. Disclosed herein is a resin containing cement composition wherein the resin comprises a solid resin accelerator and liquid hardenable resin component. The solid resin accelerator may comprise a liquid resin accelerator adsorbed and/or absorbed on a solid particle such that the liquid resin accelerator is transformed from a liquid to a solid. The liquid resin accelerator may be adsorbed onto the surface of the solid particle or absorbed into surface features, including, but not limited to, pores, vugs, and voids, for example. Solid resin accelerator may provide many benefits over a liquid resin accelerator such as, for example, simplified bulk material handling, easier mixing of resin components, and the ability to continuously add resin to cement without the need for a bulk resin mixer. The solid resin accelerator may be added directly to a dry cement alongside other dry cement additives at a bulk cement plant, for example. As used herein, the term bulk dry cement should be understood to comprise a cement, a solid resin accelerator, and optional dry cement additives. The bulk dry cement containing the may then be mixed at a wellsite using conventional cement mixing equipment to prepare a cement slurry. Liquid hardenable rein may then be added directly to the cement slurry before the cement slurry is pumped into a wellbore.

Conventional mixing of epoxy resins at a well site may be commonly performed by mixing a multifunctional glycidyl ether base resin (e.g. epoxy) such as diglycidyl ether of bisphenol A with a multifunctional primary or secondary amine hardener such as diethyl toluene diamine. An epoxy-amine addition reaction between the two species occurs resulting a primarily crosslinked polyamine network. Tertiary amines may be used as accelerators for the epoxy-amine addition reaction. This process of polymerization and solidification is commonly referred to as curing. When no primary or secondary amine is present the epoxy may homopolymerize in the presence of a tertiary amine such as 2,4,6-tris(dimethylaminomethyl)phenol resulting in a polyether network. The reactions are illustrated below.

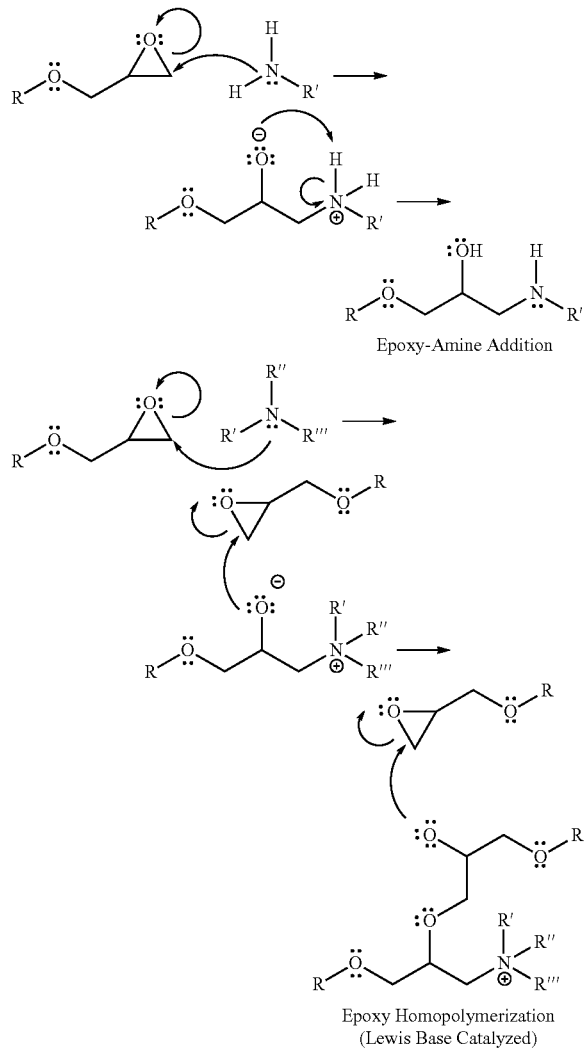

Epoxy-Amine Addition

Epoxy Homopolymerization
(Lewis Base Catalyzed)

The solid resin accelerator may be prepared by exposing a solid particle to a liquid hardening accelerator and adsorbing and/or absorbing the liquid hardening accelerator on the solid particle. The solid particle may be exposed to the liquid hardening accelerator by any process, including, but not limited to, blending in a ribbon blender, batch mixer, continuous mixer, spray drying, etc. Although only a few methods of making the solid resin accelerator may be described, one of ordinary skill in the art would readily recognize alternative methods not specifically enumerated herein. The liquid hardening accelerator may, for example, be sprayed into a ribbon blender containing the solid particle which serves as the substrate. Subsequent mixing in the ribbon blender may increase the homogeneity of application and may aid in spreading the liquid hardening accelerator on the surface of the solid substrate. Spray drying may function by creating a slurry of the solid particles, liquid hardening accelerator and solvent. The liquid hardening accelerator may be dissolved in the solvent, and upon drying the liquid hardening accelerator is deposited on the surface, voids, vugs, and pores of the solid particle. Ribbon blending may be better suited for a batch process, whereas spray drying may be suited for a continuous process. The solid particle may be dried after exposure to the liquid hardening accelerator such as in a drying oven or other suitable drying mechanism.

The solid particles may comprise any solid particles that are compatible with the resin and cement. Some exemplary solid particles may include, but are not limited to, halloysite, halloysite nanotubes, silica dust, silica flour, fumed silica, silica fume, porous silica, cement kiln dust (CKD), Portland cement, calcium silicate, pumice, perlite, metakaolin, kaolinite, natural glasses, synthetic glass, biomass ash, diatomaceous earth, iron oxide, manganese oxide, barite, calcium carbonate, slag and hollow glass spheres. The solid particles may comprise any regular or irregular geometry such as, for example, flakes, pellets, beads, spheres, fibers, rods, platelets, disks, plates, ribbons, cubes and the like. The solid particles may comprise any average particle size for a particular application. For example, the solid particles may have an average particle size in the range of about 100 nm to about 500 microns. Alternatively, the solid particles may have an average particle size in the range of about 100 nm to about 500 nm, about 500 nm to about 1 micron, about 1 micron to about 100 micron, about 100 micron to about 250 micron, or about 250 micron to about 500 micron.

Figure 2:
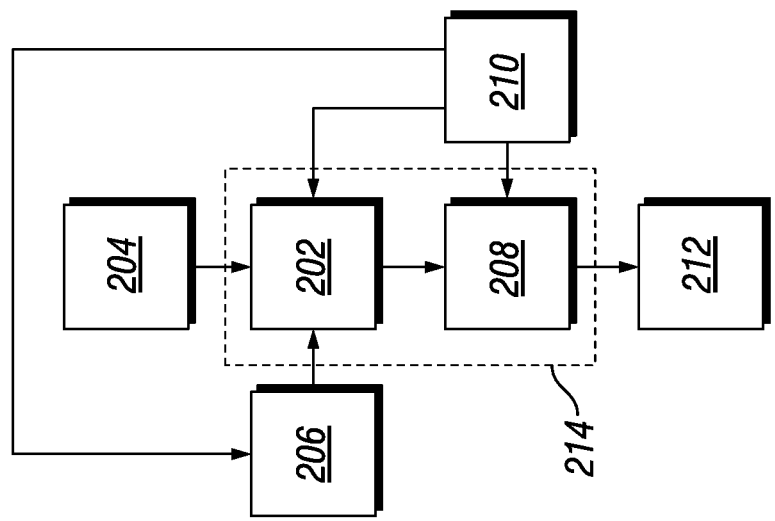
FIG. 2 is a block diagram of a cementing system configured to mix a cement and resin where a resin accelerator component is a solid.

FIG. 2 illustrates exemplary cementing system 200 which is configured to blend a resin containing cement composition wherein the resin comprises liquid hardenable resin component and solid resin accelerator. Cementing system 200 may be exemplary of a wellbore cement system configured to mix cements comprising resin wherein the resin comprises a solid resin accelerator. Although only one configuration of cementing system 200 is illustrated, one of ordinary skill in the art will recognize that the particular interconnections between components of cementing system 200 may be adjusted or reconfigured for a particular application. Cement mixer 202 may be coupled to cement source 204 and water source 206 such that bulk cement from cement source 204 and water from water source 206 may be metered into cement mixer 202. Cement source 204 may comprise a cement and a solid resin accelerator. Cement mixer 202 may comprise any kind of cement mixer suitable for mixing cements for oilfield applications such as, without limitation, a recirculating cement mixer, batch mixer, hydraulic jet mixer, or any other cement mixer known in the art. Cement mixer 202 may comprise all equipment required to mix a cement suitable for use in a well bore including, but not limited to, pumps, manifolds, control systems, tanks, valves, flowmeters, densometers, agitators and any other equipment well known in the art. Cement mixer 202 may mix a cement slurry appropriate for a particular application by, for example, metering water and bulk cement from cement source 204 into a mixing tub to produce a cement slurry with a desired density. Cement mixer 202 may also comprise liquid additive pumps and solids handling systems for adding one or more additional cement additives to the cement slurry. Cement source 204 may be any appropriate source of bulk cement such as for example, a cement storage trailer comprising bulk storage tanks containing cement. Water source 206 may comprise any water source such as water tanks, water trailer, and other sources of water known in the art. Resin source 210 may be fluidically coupled to cement mixer 202 such that liquid hardenable resin from resin source 210 may be directly added to a cement mixing tank in cement mixer 202. Liquid hardenable resin from resin source 210 may also be metered directly into a suction header on cementing pump 208 or into water from water source 206. In either configuration for the resin source, the resultant resin containing cement composition may comprise the liquid hardenable resin and the solid resin accelerator. Cement mixer 202 may be fluidically coupled to cementing pump 208. In some examples, a control system (not illustrated) may control the volume or amount of liquid hardenable resin added to cement mixer 202, water source 206, and cementing pump 208. As will be discussed in detail below, a particular liquid hardenable resin and solid cement accelerator may be mixed in certain ratios to provide mechanical properties to the cement. The control system may comprise a computer system comprising software configured to control, among other equipment, liquid additive pumps that add the liquid hardenable resin as described above. Cementing pump 208 may pressurize the resin containing cement composition such that the resin containing cement composition can be introduced into wellbore 212. In some examples, cementing pump 208 and cement mixer 202 may be disposed on a skid 214. Skid 214 may be a free standing skid for offshore operations or for land based cementing operations, skid 214 may be part of a mobile cementing unit such as a cement truck, for example.

In some examples, the liquid hardenable resin component of the cement composition comprising resin may comprise a hardenable resin, an optional solvent, and an optional aqueous diluent or carrier fluid. As used herein, the term "resin" refers to any of a number of physically similar polymerized synthetics or chemically modified natural resins including thermoplastic materials and thermosetting materials. Examples of hardenable resins that may be used in the liquid hardenable resin component include, but are not limited to, epoxy-based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, bisphenol A diglycidyl ether resins, butoxymethyl butyl glycidyl ether resins, bisphenol A-epichlorohydrin resins, bisphenol F resins, diglycidyl ether bisphenol F resin, cyclohexane dimethanol diglycidyl ether, glycidyl ether resins, polyester resins and hybrids and copolymers thereof, polyurethane resins and hybrids and copolymers thereof, acrylate resins, and mixtures thereof. Some suitable resins, such as epoxy resins, may be cured with an internal catalyst or activator so that when pumped downhole, they may be cured using only time and temperature. Other suitable resins, such as furan resins generally require a time-delayed catalyst or an external catalyst to help activate the polymerization of the resins if the cure temperature is low (i.e., less than 250° F.), but will cure under the effect of time and temperature if the formation temperature is above about 250° F., preferably above about 300° F. It is within the ability of one skilled in the art, with the benefit of this disclosure, to select a suitable resin for use in examples of the present disclosure and to determine whether a catalyst is required to trigger curing.

Selection of a particular resin may be affected by the temperature of the subterranean formation to which the composition will be introduced. By way of example, for subterranean formations having a bottom hole static temperature ("BHST") ranging from about 60° F. to about 400° F., two-component epoxy-based resins comprising a liquid hardenable resin component and a solid resin accelerator may be used. Generally, the hardenable resin may be included in the liquid hardenable resin component in an amount in a range of from about 5% to about 100% by volume of the liquid hardenable resin component. In particular examples, the hardenable resin may be included in the liquid hardenable resin component in an amount in a range of from about 75% to about 100% by volume of the liquid hardenable resin component or from about 90% to about 100% by volume of the liquid hardenable resin component. It is within the ability of one skilled in the art with the benefit of this disclosure to determine how much of the hardenable resin may be needed to achieve the desired results. Factors that may affect this decision include the type of hardenable resin and liquid hardening accelerator used in a particular application.

In some examples, a solvent may be added to the liquid hardenable resin component to reduce its viscosity for ease of handling, mixing and transferring. However, in particular examples, it may be desirable not to use such a solvent for environmental or safety reasons. Generally, any solvent that is compatible with the hardenable resin and that achieves the desired viscosity effect may be suitable for use in the liquid hardenable resin component of the resin containing cement composition. Suitable solvents may include, but are not limited to, polyethylene glycol, butyl lactate, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, d'limonene, fatty acid methyl esters, and combinations thereof. Selection of an appropriate solvent may be dependent on the hardenable resin chosen. In some examples, the amount of the solvent used in the liquid hardenable resin component may be in the range of about 0.1% to about 30% by weight of the liquid hardenable resin component. Alternatively, the solvent may be present in an amount of about 0.1% to about 10%, about 10% to about 20%, or about 20% to about 30% by volume of the liquid hardenable resin component. Alternatively, the liquid hardenable resin component may be heated to reduce its viscosity, in place of, or in addition to, using a solvent. It is within the ability of one skilled in the art with the benefit of this disclosure to determine if and how much solvent may be needed to achieve a viscosity suitable to the subterranean conditions of a particular application. Factors that may affect this decision include geographic location of the well, the surrounding weather conditions, and the desired long-term stability of the resin containing cement composition.

Generally, the liquid hardenable resin component may be included in the resin containing cement composition in an amount suitable for a particular application to impart the desired mechanical properties in the cured cement composition. For example, the liquid hardenable resin component may be included in the resin containing cement composition in an amount of from about 1 vol. % to about 90 vol. % of the resin containing cement composition. Alternatively, the liquid hardenable resin component may be present in a range of from about 1 vol. % to about 10 vol. %, about 10 vol. % to about 25 vol. %, about 25 vol. % to about 50 vol. %, about 50 vol. % to about 75 vol. %, or about 75 vol. % to about 90 vol. % of the resin containing cement composition.

As previously discussed, the resin containing cement composition may comprise a solid resin accelerator wherein the solid resin accelerator comprises a liquid resin accelerator adsorbed and/or absorbed on a solid particle. As used herein, liquid resin accelerator refers to any substance capable of transforming the liquid hardenable resin component into a hardened, consolidated mass, or accelerate the reaction thereof. Examples of suitable liquid resin accelerators that may be adsorbed and/or absorbed on a solid particle may include, but are not limited to, aliphatic amines, aliphatic tertiary amines, aromatic amines, cycloaliphatic amines, heterocyclic amines, amido amines, polyamides, polyethyl amines, polyether amines, polyoxyalkylene amines, carboxylic anhydrides, triethylenetetraamine, ethylene diamine, N-cocoalkyltrimethylene, isophorone diamine, N-aminophenyl piperazine, imidazoline, 1,2-diaminocyclohexane, polyetheramine, diethyltoluenediamine, 4,4'-diaminodiphenyl methane, methyltetrahydrophthalic anhydride, hexahydrophthalic anhydride, maleic anhydride, polyazelaic polyanhydride, phthalic anhydride, 6-Methyl-2, 4-bis(methylthio)phenylene-1,3-diamine; 2-methyl-4,6-bis (methylthio) phenylene-1,3-diamine, 2,4,6-tris(dimethylaminomethyl)phenol and combinations thereof.

As previously discussed, the solid resin accelerators may be included in a bulk dry cement. The solid resin accelerators may be included in an amount sufficient to at least partially cure or harden the liquid hardenable resin component in the resin containing cement composition. As one of ordinary skill in the art will appreciate, a particular liquid hardenable resin component may require differing amounts of liquid hardening accelerator to harden depending on the chemical identity of the particular liquid resin accelerator adsorbed and/or absorbed on the solid particle. Furthermore, there may be relatively more or less liquid resin accelerator adsorbed and/or absorbed on a solid particle depending on, among other factors, the particular technique used to prepare the solid resin accelerator. For example, the solid resin accelerator may be included in the resin containing cement composition in an amount of from about 0.1 vol. % to about 90 vol. % of the resin containing cement composition. Alternatively, the solid resin accelerator may be present in a range of from about 0.1 vol. % to about 10 vol. %, about 10 vol. % to about 25 vol. %, about 25 vol. % to about 50 vol. %, about 50 vol. % to about 75 vol. %, or about 75 vol. % to about 90 vol. % of the resin containing cement composition.

In some examples the solid resin accelerator may comprise a mixture of resin accelerators selected to impart particular qualities to the resin containing cement composition. For example, the solid resin accelerator may comprise a relatively quicker setting solid resin accelerator and a relatively slower setting solid resin accelerator. As used herein, "relatively quicker setting solid resin accelerator" and "relatively slower setting solid resin accelerator" do not imply any specific rate at which the agents set a liquid hardenable resin; instead, the terms merely indicate the relative rates at which solid resin accelerator initiate hardening of the resin. Whether a particular solid resin accelerator may be considered fast-setting or slow-setting may depend on the other solid resin accelerators with which it is used. In some examples, the ratio of relatively quicker setting solid resin accelerator to relatively slower setting solid resin accelerator may be selected to achieve a desired behavior of the solid resin accelerator. For example, the relatively quicker setting solid resin accelerator agent may be included in a component in a ratio of approximately 1:5, by volume, with the relatively slower setting solid resin accelerator. With the benefit of this disclosure, one of ordinary skill in the art should be able to select an appropriate ratio of solid resin accelerator for use in a particular application.

The resin containing cement composition may also include an optional silane coupling agent. The silane coupling agent may be used, among other things, to act as a mediator to help bond the resin to the surface of the subterranean formation, and/or the surface of the well bore. Examples of suitable silane coupling agents include, but are not limited to, N-2-(amino ethyl)-3-aminopropyltrimethoxysane; 3-glycidoxypropyltrimethoxysilane; gamma-aminopropyltriethoxysilane; N-beta-(aminoethyl)-gamma-aminopropyltrimethoxysilanes; aminoethyl-N-beta-(aminoethyl)-gamma-aminopropyl-trimethoxysilanes; gamma-ureidopropyl-triethoxysilanes; beta-(3-4 epoxy-cyclohexyl)-ethyl-trimethoxysilane; gamma-glycidoxypropyltrimethoxysilanes; vinyltrichlorosilane; vinyltris (beta-methoxyethoxy) silane; vinyltriethoxysilane; vinyltrimethoxysilane; 3-metacryloxypropyltrimethoxysilane; beta-(3,4 epoxycyclohexyl)-ethyltrimethoxysilane; r-glycidoxypropyltrimethoxysilane; r-glycidoxypropylmethylidiethoxysilane; N-beta-(aminoethyl)-r-aminopropyltrimethoxysilane; N-beta-(aminoethyl)-r-aminopropylmethyldimethoxysilane; 3-aminopropyl-triethoxysilane; N-phenyl-r-aminopropyltrimethoxysilane; r-mercaptopropyltrimethoxysilane; r-chloropropyltrimethoxysilane; vinyltrichlorosilane; vinyltris (beta-methoxyethoxy) silane; vinyltrimethoxysilane; r-metacryloxypropyltrimethoxysilane; beta-(3,4 epoxycyclohexyl)-ethyltrimethoxysila; r-glycidoxypropyltrimethoxysilane; r-glycidoxypropylmethylidiethoxysilane; N-beta-(aminoethyl)-r-aminopropyltrimethoxysilane; N-beta-(aminoethyl)-r-aminopropylmethyldimethoxysilane; r-aminopropyltriethoxysilane; N-phenyl-r-aminopropyltrimethoxysilane; r-mercaptopropyltrimethoxysilane; r-chloropropyltrimethoxysilane; N[3-(trimethoxysilyl)propyl]-ethylenediamine; substituted silanes where one or more of the substitutions contains a different functional group; and combinations thereof. The silane coupling agent may be included in the liquid hardenable resin component or as a component of the solid resin accelerator.

A variety of cements may be included in the resin containing cement composition, including cements comprised of calcium, aluminum, silicon, oxygen, and/or sulfur which set and harden by reaction with water. Such hydraulic cements may include Portland cements, pozzolan cements, gypsum cements, high alumina content cements, slag cements, high magnesia content cements, shale cements, acid/base cements, fly ash cements, zeolite cement systems, kiln dust cement systems, microfine cements, metakaolin cements, pumice/lime cements and their combinations. Portland cements that may be suited for use in examples of the present disclosure may be classified as Class A, C, H and G cements according to American Petroleum Institute, API Specification for Materials and Testing for Well Cements, API Specification 10, Fifth Ed., Jul. 1, 1990. In addition, in some examples, hydraulic cements suitable for use in the present disclosure may be classified as ASTM Type I, II, or III. The cementitious materials may be combined with the aqueous base fluids to form a cement slurry.

The cement may be included in the resin containing cement composition in any suitable amount, including, but not limited to, about 20% to about 99% by weight of the cement composition. Suitable amounts may include, but are not limited to, 20%, 30%, 40%, 50%, 60, 70%, 80%, or 99% by weight of the cement composition. Those of ordinary skill in the art, with the benefit of this disclosure, should be able to select an appropriate concentration of the cement for a particular application The water used in the resin containing cement composition may be fresh water or salt water. As used herein, the term "salt water" refers to unsaturated salt water and saturated salt water, including brines and seawater. Generally, the water may be from any source, provided that it should not contain an excess of compounds that may undesirably affect other components in the resin containing cement composition. Further, the water may be present in an amount sufficient to form a pumpable slurry. Suitable amounts of water may be present in the cement composition in an amount including, but not limited to, about 33% to about 200% BWOC (by weight of cement). For example, the water may be present in the resin containing cement composition in the range of about 35% to about 70% BWOC. Suitable amounts of water may include, but are not limited to, 30%, 50%, 70%, 90%, 110%, 130%, 150%, 170%, 190%, or 200% BWOC. One of ordinary skill in the art with the benefit of this disclosure will recognize the appropriate amount of water for a chosen application.

The resin containing cement composition may include a strength retrogression additive. Any suitable strength retrogression additive may be used. Suitable strength retrogressive additives may include, but are not limited to, coarse silica flour, fine silica flour, and or a combination thereof. The strength retrogression additive may be present in any suitable amount. Suitable amounts may include, but are not limited to, about 20% to about 75% BWOC, or about 25% to about 35% BWOC. Suitable amounts of strength retrogressive additive may include, but are not limited to, 20%, 25%, 30%, 35%, 40%, 45%, 50%, 60%, 70%, or 75% BWOC. Those of ordinary skill in the art, with the benefit of this disclosure, will be able to select the appropriate type and amount of the strength regression additive to include in the cement compositions of the present disclosure for a particular application.

The resin containing cement composition may include a fluid loss control additive to reduce the loss of fluid, i.e., water, from the cement compositions when they contact permeable subterranean formations or zones. Excessive fluid loss causes a cement composition to be prematurely dehydrated which limits the amount of cement composition that can be pumped, decreases the compressive strength of the cement composition and prevents or reduces bond strength between the set cement composition and a subterranean zone, the walls of pipe and/or the walls of the well bore. Certain polymers have been used heretofore as fluid loss control additives in cementing operations. Suitable fluid loss control additives may include, but are not limited to, cellulosic materials such as hydroxyethyl cellulose and carboxymethylhydroxyethyl cellulose, copolymers of 2-acrylamido-2-methylpropanesulfonic acid and acrylamide or N,N-dimethylacrylamide, graft copolymers comprising a backbone of lignin or lignite and pendant groups comprising at least one member selected from the group consisting of 2-acrylamido-2-methylpropanesulfonic acid, acrylonitirile, and N,N-dimethylacrylamide and or any combinations thereof. Fluid loss control additives may be present in any suitable amount. A suitable amount may include, but is not limited to, about 0.1% to about 5% BWOC, or about 0.3% to about 3% BWOC. One of ordinary skill in the art, with the benefit of this disclosure, will be able to select the appropriate type and amount of the fluid loss control additive to include in the cement compositions of the present disclosure for a particular application.

Resin containing cement composition may experience rheological problems over the duration of the placement period if not properly prepared. One such problem may be the settling of solids in for example. If the solids are not adequately suspended in the composition, the composition may segregate and be unusable. Methods to counteract this issue may include the use of water viscosifying suspension additives such as polymeric additives or frequent agitation to maintain the solids suspension. Examples may include any viscosifier formulated in the optimal amount and/or polysaccharide biopolymer sub-groups including: scleroglucan, carragenans, xanthan, welan, diutan gums, celluloses, hydroxyl ethyl celluloses as well as alternatives such as: synthetic polymer viscosifiers, e.g. high molecular weight acrylamide polymers, acrylic acid-acrylamide co-polymers, and acrylamide co-polymers. However, these solutions are expensive and time-consuming. The suspension additives may be present in any suitable amount, including, but not limited to, an amount of about 0.1% to about 7% BWOC. Alternatively, from about 0.3% to about 5% BWOC, or about 0.5% to about 3% BWOC.

Other additives suitable for use in subterranean cementing operations also may be added to the resin containing cement composition. Examples of such additives include, but are not limited to, set accelerators, weighting agents, lightweight additives, gas-generating additives, mechanical property enhancing additives, lost-circulation materials, dispersants, foaming agents, defoaming agents, thixotropic additives, gas, expansion agents and combinations thereof. Specific examples of these, and other, additives include salts, fibers, hydratable clays, calcined shale, vitrified shale, microspheres, fly ash, slag, diatomaceous earth, metakaolin, rice husk ash, natural pozzolan, zeolite, cement kiln dust, lime, elastomers, resins, latex, combinations thereof, and the like. A person having ordinary skill in the art, with the benefit of this disclosure, will readily be able to determine the type and amount of additive useful for a particular application and desired result.

The resin containing cement composition may set to have a desirable compressive strength. Compressive strength is generally the capacity of a material or structure to withstand axially directed pushing forces. The compressive strength may be measured at a specified time after preparation of the cement composition while the cement composition is maintained under specified temperature and pressure conditions. Compressive strength can be measured by either destructive or non-destructive methods. The destructive method physically tests the strength of treatment fluid samples at various points in time by crushing the samples in a compression-testing machine. The compressive strength is calculated from the failure load divided by the cross-sectional area resisting the load and is reported in units of pound-force per square inch (psi). Non-destructive methods may employ a UCA™ Ultrasonic Cement Analyzer, available from Fann™ Instrument Company, Houston, Tex. Compressive strength values may be determined in accordance with API RP 10B-2, Recommended Practice for Testing Well Cements, First Edition, July 2005.

By way of example, the resin containing cement composition may develop a 24-hour compressive strength in the range of from about 50 psi (about 3.5 bar) to about 12000 psi (about 827 bar), alternatively, from about 100 psi (about 6.9 bar) to about 4500 psi (about 310.3 bar), or alternatively from about 4500 psi (about 310.3 bar) to about 12000 psi (about 827 bar). Without limitation, the cement compositions may develop a compressive strength in 24 hours of at least about 4500 psi (310.3 bar), at least about 1000 psi (about 551.6 bar), at least about 12000 psi (about 827 bar), or more.

In some examples, the resin containing cement composition may have desirable thickening times. Thickening time typically refers to the time a fluid, such as the cement composition, remains in a fluid state capable of being pumped. As used herein, the "thickening time" is how long it takes for a cement composition to become unpumpable at a specified temperature and specified pressure. The pumpability of a cement composition is related to the consistency of the composition. The consistency of a cement composition is measured in Bearden units of consistency (Bc), a dimensionless unit with no direct conversion factor to the more common units of viscosity. As used herein, a cement composition becomes "unpumpable" when the consistency of the composition reaches 70 Bc. A number of different laboratory techniques may be used to measure thickening time. A pressurized consistometer, operated in accordance with the procedure set forth in the aforementioned API RP Practice 10B-2, may be used to measure whether a fluid is in a pumpable fluid state. The cement compositions may have thickening times greater than about 1 hour, alternatively, greater than about 2 hours, greater than about 15 hours, greater than about 30 hours, greater than about 100 hours, or alternatively greater than about 190 hours at 500 psi (about 34.5 bar) and temperatures in a range of from about 50° F. to about 300° F., alternatively, in a range of from about 100° F. to about 200° F., and alternatively at a temperature range from about 200° F. to about 300° F.

In some examples, the resin containing cement composition may further comprise CKD (cement kiln dust), which is a material generated in the manufacture of cement. CKD, as that term is used herein, refers to a partially calcined kiln feed which is removed from the gas stream and collected, for example, in a dust collector during the manufacture of cement. Usually, large quantities of CKD are collected in the production of cement that are commonly disposed of as waste. Disposal of the CKD as waste can add undesirable costs to the manufacture of the cement, as well as the environmental concerns associated with its disposal. The chemical analysis of CKD from various cement manufactures varies depending on a number of factors, including the particular kiln feed, the efficiencies of the cement production operation, and the associated dust collection systems. CKD generally may comprise a variety of oxides, such as $SiO_2$, $Al_2O_3$, $Fe_2O_3$, CaO, MgO, $SO_3$, $Na_2O$, and $K_2O$. The term "CKD" is used herein to mean cement kiln dust made as described above and equivalent forms of cement kiln dust made in other ways.

CKD may be used, among other things, as a non-hydrating filler material to lower the consumption of the more expensive components (e.g., hardenable resins, etc.) that are used in the resin containing cement composition. While the CKD is a cementitious component that sets and hardens in the presence of water, the CKD may be non-hydrated when mixed with the liquid hardenable resin. In this manner, the resin containing cement composition may be placed into a subterranean formation and allowed to harden therein with the CKD remaining non-hydrated. Because the CKD is present in the hardened composition, it is believed that the CKD may help counteract the potential formation of cracks in the hardened composition and/or micro-annulus that may form between the hardened composition and the pipe string or the well-bore wall. In general, the CKD is capable of setting and hardening when contacted by aqueous fluids to inhibit fluid flow through the crack and/or micro-annulus. Accordingly, the CKD may prevent and/or reduce the loss of zonal isolation in spite of the formation of cracks and/or micro-annulus, potentially resulting in an improved annular seal for examples of the resin containing cement composition s.

Generally, the CKD may be included in the resin containing cement composition in an amount in a range of from about 1% to about 60% by volume of the resin containing cement composition. In particular examples, the CKD may be included in the resin containing cement composition in an amount in a range of from about 20% to about 40% by volume of the resin containing cement composition. In specific examples, the CKD may be present in an amount ranging between any of and/or including any of about of about 1%, about 10%, about 20%, about 30%, about 40%, about 50%, or about 60% by volume of the resin containing cement composition. One of ordinary skill in the art, with the benefit of this disclosure, will recognize the appropriate amount of CKD to include for a chosen application.

While the preceding description describes CKD, the present disclosure is broad enough to encompass the use of other partially calcined kiln feeds. For example, examples of the resin containing cement composition s may comprise lime kiln dust, which is a material that is generated during the manufacture of lime. The term "lime kiln dust" typically refers to a partially calcined kiln feed which can be removed from the gas stream and collected, for example, in a dust collector during the manufacture of lime. The chemical analysis of lime kiln dust from various lime manufactures varies depending on a number of factors, including the particular limestone or dolomitic limestone feed, the type of kiln, the mode of operation of the kiln, the efficiencies of the lime production operation, and the associated dust collection systems. Lime kiln dust generally may comprise varying amounts of free lime and free magnesium, lime stone, and/or dolomitic limestone and a variety of oxides, such as $SiO_2$, $Al_2O_3$, $Fe_2O_3$, CaO, MgO, $SO_3$, $Na_2O$, and $K_2O$, and other components, such as chlorides.

In some examples, the resin containing cement composition may further comprise a weighting material. As used herein, the term "weighting material" refers to any particulate matter added to the resin containing cement composition to increase or lower density. Examples of weighting materials for lowering density include, but are not limited to hollow microspheres. Examples of suitable hollow microspheres include, but are not limited to, hollow mineral glass spheres, silica and alumina cenospheres, hollow glass microspheres, ceramic microspheres, polymeric microspheres, and plastic microspheres, Examples of suitable weighting materials for increasing density include, but are not limited to, silica, ilmenite, hematite, barite, Portland cement, manganese tetraoxide, and combinations thereof. Specific examples of weighting materials for increasing density include, but are not limited to, rystalline silica weighting materials and hematite weighting materials.

The mean particulate sizes of the weighting material may generally range from about 2 nanometers to about 3000 microns in diameter; however, in certain circumstances, other mean particulate sizes may be desired and will be entirely suitable for practice of the present disclosure. It should be understood that the term "particulate," as used in this disclosure, includes all known shapes of materials, including substantially spherical materials, fibrous materials, polygonal materials (such as cubic materials), and mixtures thereof. In particular examples, the particulate size of the weighting material may be selected to impart a desired viscosity to the resin containing cement composition. Moreover, in particular examples, weighting materials having different particulate sizes may be mixed to achieve a desired viscosity of the resin containing cement composition.

Generally, the weighting material may be included in the resin containing cement composition in an amount in a range of from about 1% to about 60% by volume of the resin containing cement composition. In particular examples, the weighting material may be included in the resin containing cement composition in an amount in a range of from about 20% to about 40% by volume of the resin containing cement composition.

In some examples, the resin containing cement composition may further comprise swellable particles. As used herein, the term "swellable particle" refers to any particle that swells upon contact with oil, gas, a combination of oil and gas, and/or an aqueous fluid (e.g., water). Swellable particles suitable for use in examples of the present disclosure may generally swell by up to about 50% of their original size at the surface. Under downhole conditions, the amount of swelling may vary depending on the conditions presented. For example, in some examples, the amount of swelling may be at least 10% under downhole conditions. In particular examples, the amount of swelling may be up to about 50% under downhole conditions. However, as those of ordinary skill in the art, with the benefit of this disclosure, will appreciate, the actual amount of swelling when the swellable particles are included in a resin containing cement composition may depend on the concentration of the swellable particles included in the composition, among other factors. In accordance with particular examples of the present disclosure, the swellable particles may be included in the resin containing cement composition, for example, to counteract the formation of cracks in a resultant well-bore seal and/or micro-annulus between the well bore plug and the pipe string or the formation. In general, the swellable particles are capable of swelling when contacted by one or more of the previously mentioned fluids to inhibit fluid flow through the crack and/or micro-annulus. Accordingly, the swellable particles may prevent and/or reduce the loss of zonal isolation in spite of the formation of cracks and/or micro-annulus, potentially resulting in an improved annular seal for the resin containing cement composition.

Some specific examples of suitable swellable elastomers include, but are not limited to, natural rubber, acrylate butadiene rubber, polyacrylate rubber, isoprene rubber, choloroprene rubber, butyl rubber (IIR), brominated butyl rubber (BIIR), chlorinated butyl rubber (CIIR), chlorinated polyethylene (CM/CPE), neoprene rubber (CR), styrene butadiene copolymer rubber (SBR), sulphonated polyethylene (CSM), ethylene acrylate rubber (EAM/AEM), epichlorohydrin ethylene oxide copolymer (CO, ECO), ethylene-propylene rubber (EPM and EDPM), ethylene-propylene-diene terpolymer rubber (EPT), ethylene vinyl acetate copolymer, fluorosilicone rubbers (FVMQ), silicone rubbers (VMQ), poly 2,2,1-bicyclo heptene (polynorbomeane), and alkylstyrene. One example of a suitable swellable elastomer comprises a block copolymer of a styrene butadiene rubber. Examples of suitable elastomers that swell when contacted by oil include, but are not limited to, nitrile rubber (NBR), hydrogenated nitrile rubber (HNBR, HNS), fluoro rubbers (FKM), perfluoro rubbers (FFKM), tetrafluorethylene/propylene (TFE/P), isobutylene maleic anhydride. Other swellable elastomers that behave in a similar fashion with respect to oil or aqueous fluids also may be suitable for use in particular examples of the present disclosure. Furthermore, combinations of suitable swellable elastomers may also be used in particular examples of the present disclosure.

Some specific examples of suitable water-swellable polymers, include, but are not limited to, starch-polyacrylate acid graft copolymer and salts thereof, polyethylene oxide polymer, carboxymethyl cellulose type polymers, polyacrylamide, poly(acrylic acid) and salts thereof, poly(acrylic acid-co-acrylamide) and salts thereof, graft-poly(ethylene oxide) of poly(acrylic acid) and salts thereof, poly(2-hydroxyethyl methacrylate), poly(2-hydroxypropyl methacrylate), and combinations thereof. Other water-swellable polymers that behave in a similar fashion with respect to aqueous fluids also may be suitable for use in particular examples of the present disclosure. In certain examples, the water-swellable polymers may be crosslinked and/or lightly crosslinked. Those of ordinary skill in the art, with the benefit of this disclosure, will be able to select an appropriate swellable elastomer and/or water-swellable polymer for use in particular examples of the resin containing cement composition of the present disclosure based on a variety of factors, including the particular application in which the composition will be used and the desired swelling characteristics.

Generally, the swellable particles may be included in the re resin containing cement composition in an amount sufficient to provide the desired mechanical properties. In some examples, the swellable particles may be present in the resin containing cement composition s in an amount up to about 25% by weight of the hardenable resin. In some examples, the swellable particles may be present in the resin containing cement composition s in a range of about 5% to about 25% by weight of the hardenable resin. In some examples, the swellable particles may be present in the resin containing cement composition s in a range of about 15% to about 20% by weight of the hardenable resin.

In addition, the swellable particles that may be utilized may have a wide variety of shapes and sizes of individual particles suitable for use in accordance with examples of the present disclosure. By way of example, the swellable particles may have a well-defined physical shape as well as an irregular geometry, including the physical shape of platelets, shavings, fibers, flakes, ribbons, rods, strips, spheroids, beads, pellets, tablets, or any other physical shape. In some examples, the swellable particles may have a mean particle size in the range of about 5 microns to about 1,500 microns. In some examples, the swellable particles may have a mean particle size in the range of about 20 microns to about 500 microns. However, particle sizes outside these defined ranges also may be suitable for particular applications.

In some examples of the present disclosure, additional solid materials may also be included in the resin containing cement composition to enhance the strength, hardness, and/or toughness of the resulting well-bore seal. These solid materials may include both natural and man-made materials, and may have any shape, including, but not limited to, beaded, cubic, bar-shaped, cylindrical, or mixtures thereof, and may be in any form including, but not limited to flake or fiber form. Suitable materials may include, but are not limited to, cellulose fibers, carbon fibers, glass fibers, mineral fibers, plastic fibers (e.g., polypropylene and polyacrylic nitrile fibers), metallic fibers, metal shavings, Kevlar fibers, basalt fibers, wollastonite, micas (e.g., phlogopites and muscovites), and mixtures thereof. In some examples, nanoparticles and/or nanofibers may also be included in the resin containing cement composition, wherein the nanoparticles and/or nanofibers have at least one dimension less than 1 micron and, alternatively, less than about 100 nanometers.

Carbon fibers suitable for use in particular examples of the present disclosure include high tensile modulus carbon fibers which have a high tensile strength. In some examples, the tensile modulus of the carbon fibers may exceed 180 GPa, and the tensile strength of the carbon fibers may exceed 3000 MPa. Generally, the fibers may have a mean length of about 1 mm or less. In some examples, the mean length of the carbon fibers is from about 800 to about 500 microns. In particular example, the carbon fibers have a mean length in the range of from about 100 to about 200 microns. In particular examples, the carbon fibers may be milled carbon fibers. Suitable, commercially available carbon fibers include, but are not limited to, "AGM-94" and "AGM-99" carbon fibers both available from Asbury Graphite Mills, Inc., of Asbury, N.J.

Metallic fibers suitable for use in particular examples of the present disclosure may include non-amorphous (i.e., crystalline) metallic fibers. In particular examples, the non-amorphous metallic fibers may be obtained by cold drawing steel wires (i.e., steel wool). Suitable metallic fibers include, but are not limited to, steel fibers. Generally, the length and diameter of the metallic fibers may be adjusted such that the fibers are flexible and easily dispersible in the resin containing cement composition, and the resin containing cement composition is easily pumpable.

These additional solid materials may be present in the resin containing cement composition of the present disclosure individually or in combination. Additionally, the solid materials of the present disclosure may be present in the resin containing cement composition in a variety of lengths and/or aspect ratios. A person having ordinary skill in the art, with the benefit of this disclosure, will recognize the mixtures of type, length, and/or aspect ratio to use to achieve the desired properties of a resin containing cement composition for a particular application.

Generally, examples of the resin containing cement composition s of the present disclosure may be used for any of a variety different purposes in which the resin containing cement composition may be prepared and allowed to harden. In some examples, the resin containing cement composition may be introduced into a subterranean formation and allowed to harden. As used herein, introducing the resin containing cement composition into a subterranean formation includes introduction into any portion of the subterranean formation, including, without limitation, into a well bore drilled into the subterranean formation, into a near well bore region surrounding the well bore, or into both. The resin containing cement composition may be allowed to harden in the subterranean formation for a number of purposes including, without limitation: to isolate the subterranean formation from a portion of the well bore; to support a conduit in the well bore; to plug a void in the conduit; plug a void in a cement sheath disposed in an annulus of the well bore; to plug a perforation; to plug void (e.g., micro-annulus) between the cement sheath and the conduit; to prevent the loss of aqueous or nonaqueous drilling fluids into loss circulation zones such as a void, vugular zone, or fracture; to plug a well for abandonment purposes; to form a temporary plug to divert treatment fluids; as a chemical packer to be used as a fluid in front of cement slurry in cementing operations; or to seal an annulus between the well bore and an expandable pipe or pipe string. For instance, the resin containing cement composition may withstand substantial amounts of pressure, e.g., the hydrostatic pressure of a drilling fluid or cement slurry, without being dislodged or extruded. The resin containing cement composition may set into a flexible, resilient and tough material, which may prevent further fluid losses when circulation is resumed. The resin containing cement composition may also form a non-flowing, intact mass inside the loss-circulation zone. This mass plugs the zone and inhibits loss of subsequently pumped drilling fluid, which allows for further drilling.

In primary-cementing examples, the resin containing cement composition may be introduced into a well-bore annulus such as a space between a wall of a well bore and a conduit (e.g., pipe strings, liners) located in the well bore or between the conduit and a larger conduit in the well bore. The resin containing cement composition may be allowed to harden to form an annular sheath of the hardened composition in the well-bore annulus. Among other things, the hardened composition formed by the resin containing cement composition may form a barrier, preventing the migration of fluids in the well bore. The hardened composition also may, for example, support the conduit in the well bore and/or form a bond between the well-bore wall and the conduit.

In some examples, the conduit may also be cemented into a well-bore annulus by utilizing what is known as a reverse-cementing method. The reverse-cementing method comprises displacing the resin containing cement composition into the annulus between the conduit and the annulus between an existing string, or an open hole section of the wellbore. As the resin containing cement composition is pumped down the annular space, drilling fluids ahead of the resin containing cement composition are displaced around the lower ends of the conduit and up the inner diameter of the conduit and out at the surface. The fluids ahead of the resin containing cement composition may also be displaced upwardly through a work string that has been run into the inner diameter of the conduit and sealed off at its lower end. Because the work string has a smaller inner diameter, fluid velocities in the work string will be higher and will more efficiently transfer the cuttings washed out of the annulus during placement of the resin containing cement composition. In an example, a small amount of resin containing cement composition will be pumped into the conduit and the work string. As soon as a desired amount of resin containing cement composition has been pumped into the annulus, the work string may be pulled out of its seal receptacle and excess resin containing cement composition that has entered the work string can be reverse-circulated out the lower end of the work string to the surface.

In remedial-cementing examples, a resin containing cement composition may be used, for example, in squeeze-cementing operations or in the placement of cement plugs. By way of example, the resin containing cement composition may be placed in a well bore to plug voids, such as holes or cracks in the pipe strings; holes, cracks, spaces, or channels in the sheath; and very small spaces (commonly referred to as "micro-annuli") between the sheath and the exterior surface of the pipe or well-bore wall.

Figure 3:
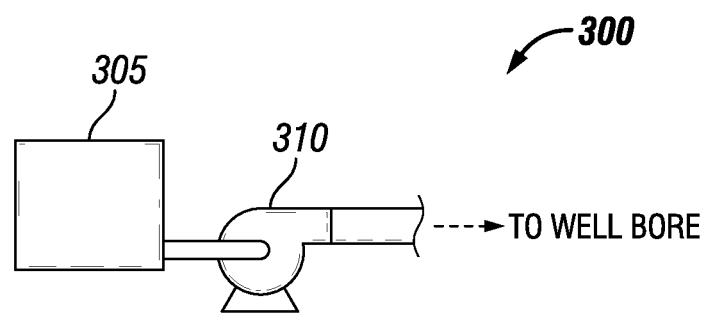
FIG. 3 is a schematic illustration of an example system for the preparation and delivery of a resin containing cement composition into a wellbore.

Example methods of using the resin containing cement compositions will now be described in more detail with reference to FIGS. 3-8. Any of the previous examples of the resin containing cement compositions may apply in the context of FIGS. 3-8. Referring now to FIG. 3, the preparation of a resin containing cement composition in accordance with examples will now be described. FIG. 3 illustrates a system 300 for the preparation of a resin containing cement composition and subsequent delivery of the resin containing cement composition to a wellbore in accordance with certain examples. As shown, the resin containing cement composition may be mixed in mixing equipment 305, such as a jet mixer, re-circulating mixer, or a batch mixer, for example, and then pumped via pumping equipment 310 to the wellbore. In some examples, the mixing equipment 305 and the pumping equipment 310 may be disposed on one or more cement trucks as will be apparent to those of ordinary skill in the art. If a resin containing cement composition is to be used, a bulk dry cement comprising a solid resin accelerator may be preformulated and prepared at a bulk cement plant, for example. A cement slurry may be mixed by combing the bulk dry cement in mixing equipment 305 or in other mixing equipment. Once the cement slurry is prepared, a liquid resin additive may be blended with the cement slurry by injecting the liquid resin additive on a suction header on pumping equipment 310. Alternatively, the liquid resin additive may be blended with the cement slurry in mixing equipment 305. Pumping equipment 310 may pump the cement slurry containing the liquid resin additive to the wellbore.

Figure 4:
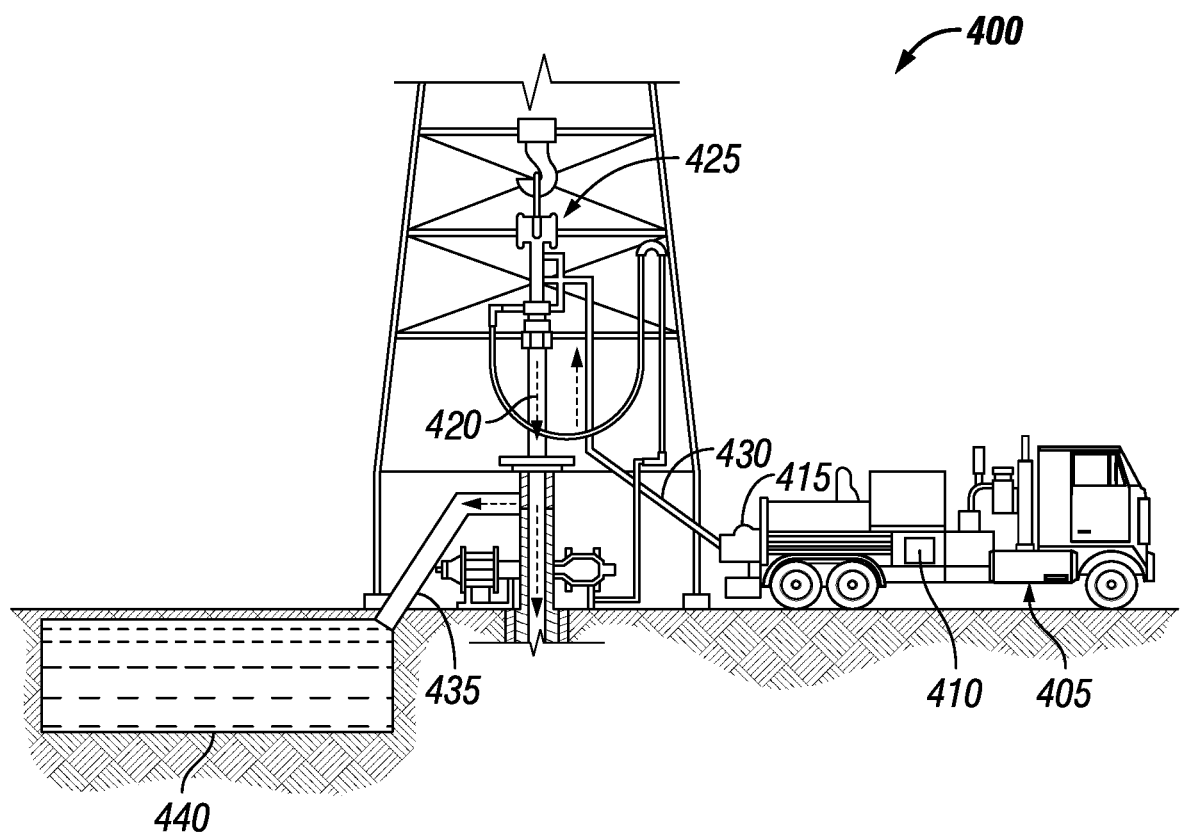
FIG. 4 is a schematic illustration of example surface equipment that may be used in the placement of a resin containing cement composition into a wellbore.

An example primary cementing technique using a resin containing cement composition will now be described with reference to FIGS. 4 and 5. FIG. 4 illustrates surface equipment 400 that may be used in the placement of a resin containing cement composition in accordance with certain examples. It should be noted that while FIG. 4 generally depicts a land-based operation, those skilled in the art will readily recognize that the principles described herein are equally applicable to subsea operations that employ floating or sea-based platforms and rigs, without departing from the scope of the disclosure. As illustrated by FIG. 4, the surface equipment 400 may include a cementing unit 405, which may include one or more cement trucks. The cementing unit 405 may include mixing equipment 410 and pumping equipment 415 (e.g., FIG. 3) as will be apparent to those of ordinary skill in the art. Cementing unit 405, or multiple cementing units 405, may pump a resin containing cement composition 420 through a feed pipe 430 and to a cementing head 425 which conveys the resin containing cement composition 420 downhole. Resin containing cement composition 430 may displace other fluids present in the wellbore, such as drilling fluids and spacer fluids, which may exit the wellbore through an annulus and flow through pipe 435 to mud pit 440.

Figure 5:
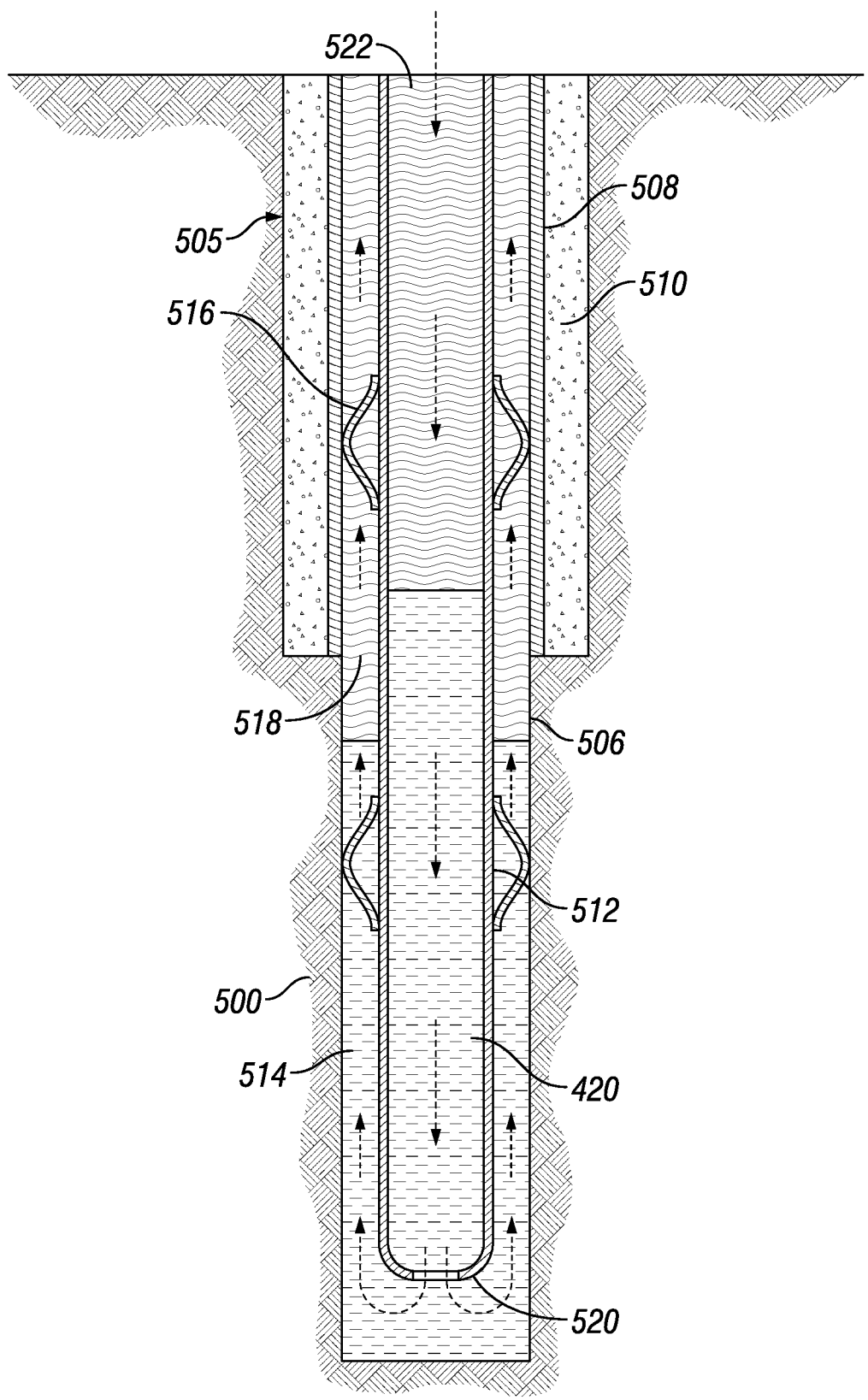
FIG. 5 is a schematic illustration of an example in which a resin containing cement composition is used in a primary cementing application.

FIG. 5 generally depicts the placement of resin containing cement composition 420 into a subterranean formation 500 in accordance with example examples. As illustrated, a wellbore 505 may be drilled into the subterranean formation 500. While wellbore 505 is shown extending generally vertically into the subterranean formation 500, the principles described herein are also applicable to wellbores that extend at an angle through the subterranean formation 500, such as horizontal and slanted wellbores. As illustrated, the wellbore 505 comprises walls 506. In the illustrated example, a surface casing 508 has been inserted into the wellbore 505. The surface casing 508 may be cemented in the wellbore 505 by a cement sheath 510. In alternative examples, surface casing 508 may be secured in the wellbore 505 by a hardened resin or hardened resin-cement composite sheath in place of cement sheath 510. In the illustrated example, one or more additional conduits (e.g., intermediate casing, production casing, liners, etc.), shown here as casing 512 may also be disposed in the wellbore 505. As illustrated, there is a wellbore annulus 514 formed between the casing 512 and the walls 506 of the wellbore 505 and/or the surface casing 508. One or more centralizers 516 may be attached to the casing 512, for example, to centralize the casing 512 in the wellbore 505 prior to and during the cementing operation.

With continued reference to FIG. 5, a first spacer fluid 518 may be pumped down the interior of the casing 512. The first spacer fluid 518 may be allowed to flow down the interior of the casing 512 through the casing shoe 520 at the bottom of the casing 512 and up around the casing 512 into the wellbore annulus 514. After the first spacer fluid 518 has been pumped into the casing 512, resin containing cement composition 240 may be pumped into the casing 512. In a manner similar to pumping the first spacer fluid 518, the resin containing cement composition 420 may be allowed to flow down the interior of the casing 512 through the casing shoe 520 at the bottom of the casing 512 and up around the casing 512 into the wellbore annulus 514. After the resin containing cement composition 420 has been pumped into the casing 512, a second spacer fluid 522 may be pumped into casing 512 and allowed to flow down the interior of the casing 512. The first spacer fluid 518 and the second spacer fluid 522 may be used to separate the resin containing cement composition 420 from fluids introduced into the wellbore 505 either in front of or behind the resin containing cement composition 420. Once the resin containing cement composition 420 has been placed into the desired position in the wellbore annulus 514, the resin containing cement composition 420 may be allowed to set in the wellbore annulus 514, for example, to form a hardened resin sheath that supports and positions the casing 512 in the wellbore 505. Alternatively, one or no spacer fluids may be used, and resin containing cement composition 420 may not need to be separated from other fluids introduced previously or subsequently into wellbore 505. While not illustrated, other techniques may also be utilized for introduction of the resin containing cement composition 420. By way of example, reverse circulation techniques may be used that include introducing the resin containing cement composition 420 into the subterranean formation 500 by way of the wellbore annulus 514 instead of through the casing 512. These techniques may also utilize a first spacer fluid 518 and a second spacer fluid 522, or they may utilize one or none spacer fluids. As it is introduced, the resin containing cement composition 420 may displace the first spacer fluid 518. At least a portion of the first spacer fluid 518 may exit the wellbore annulus 514 via a flow line 38 and be deposited, for example, in one or more mud pits 440, as shown on FIG. 4.

Figure 6:
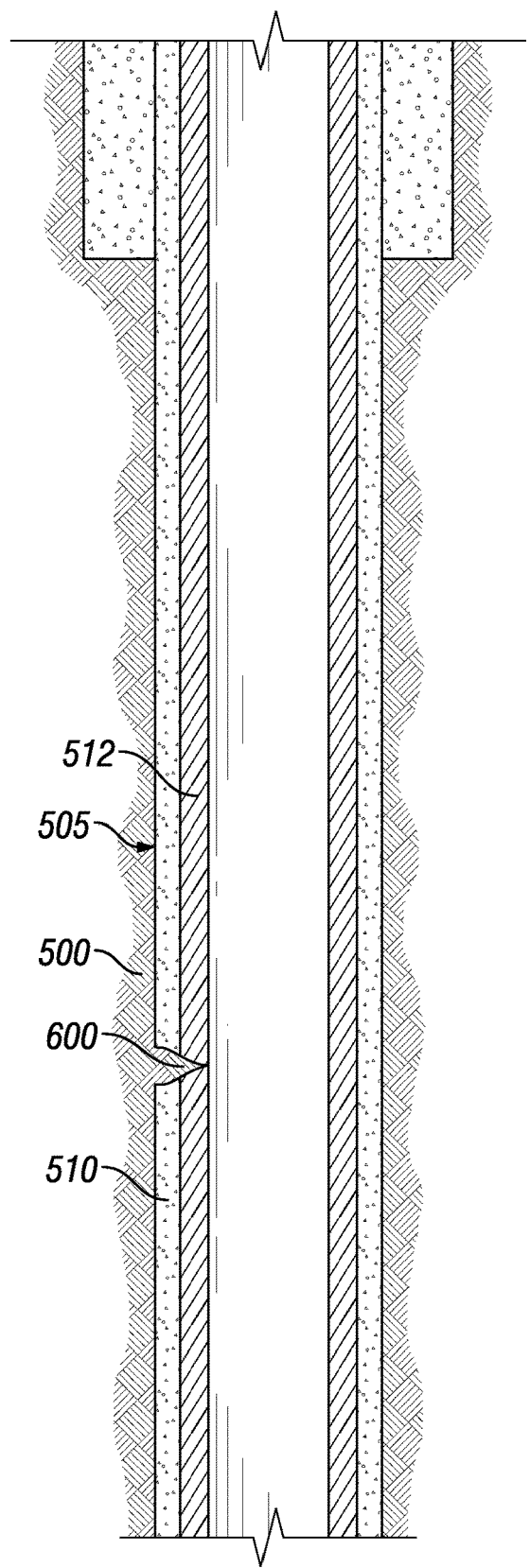
FIG. 6 is a schematic illustration showing the presence of a small perforation in a casing and cement sheath in a wellbore.
Figure 7:
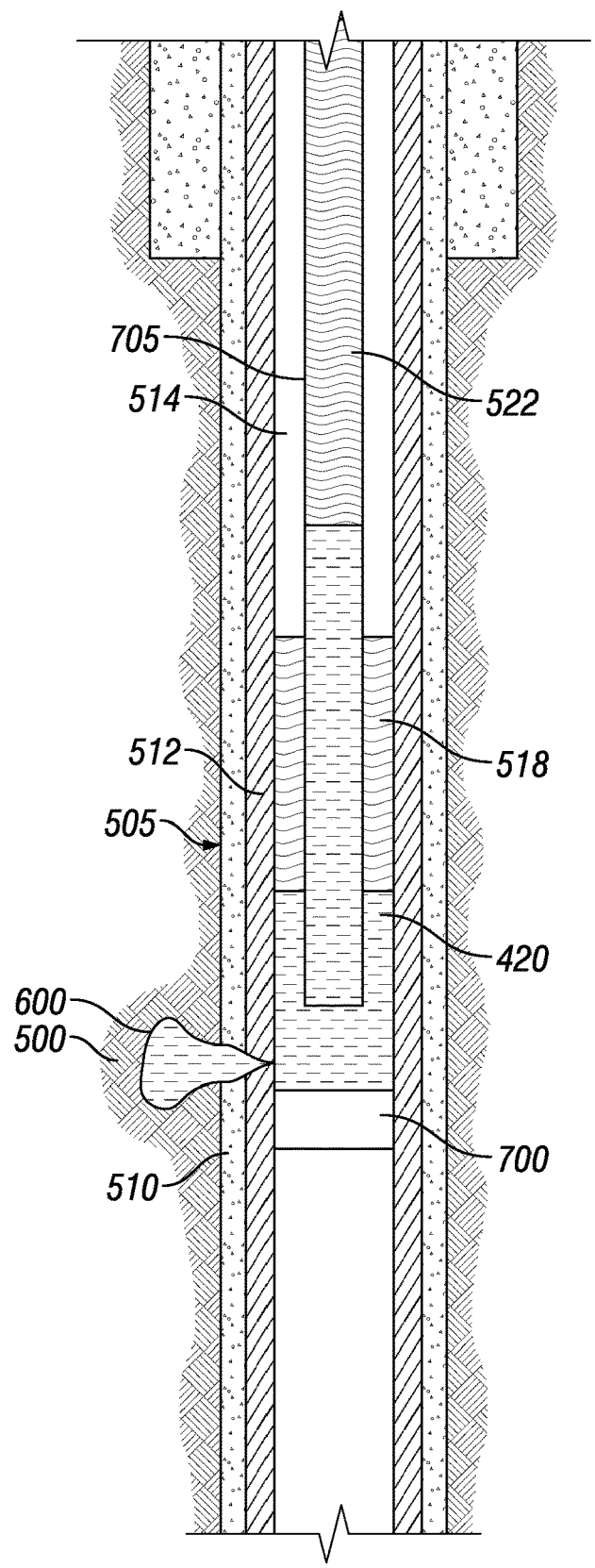
FIG. 7 is a schematic illustration of an example in which a resin containing cement composition is used in a remedial cementing application.
Figure 8:
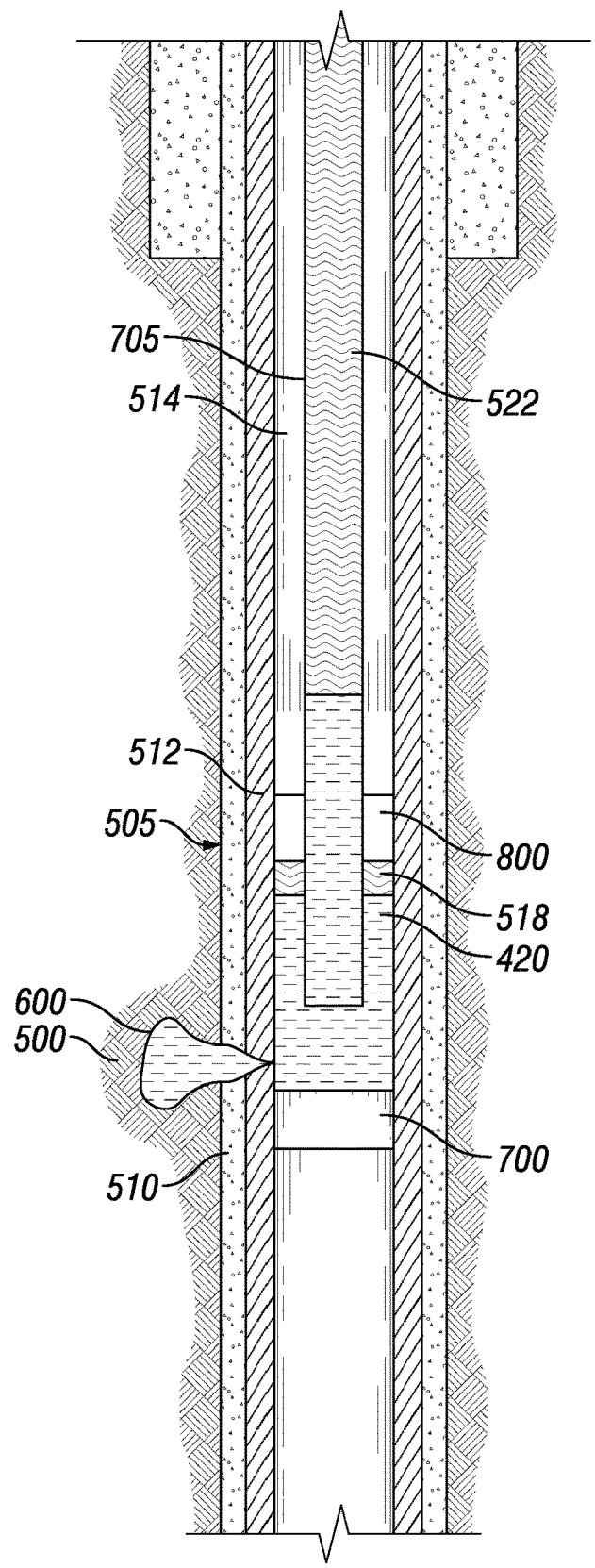
FIG. 8 is a schematic illustration of another example in which a resin containing cement composition is used in a remedial cementing application.
Figure 9:
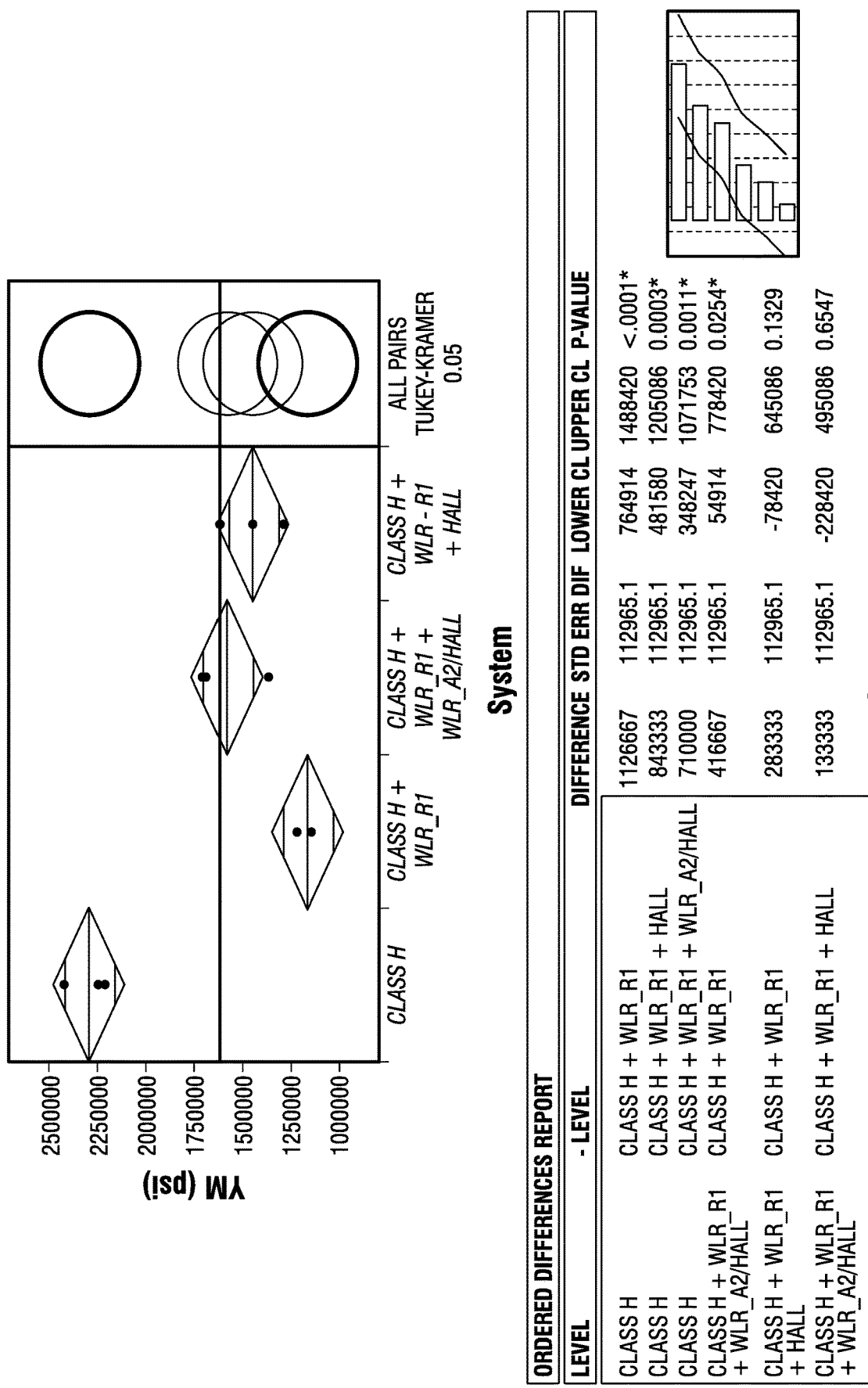
FIG. 9 is a Tukey-Kramer plot of results of a Young's modulus test of cement compositions.
Figure 10:
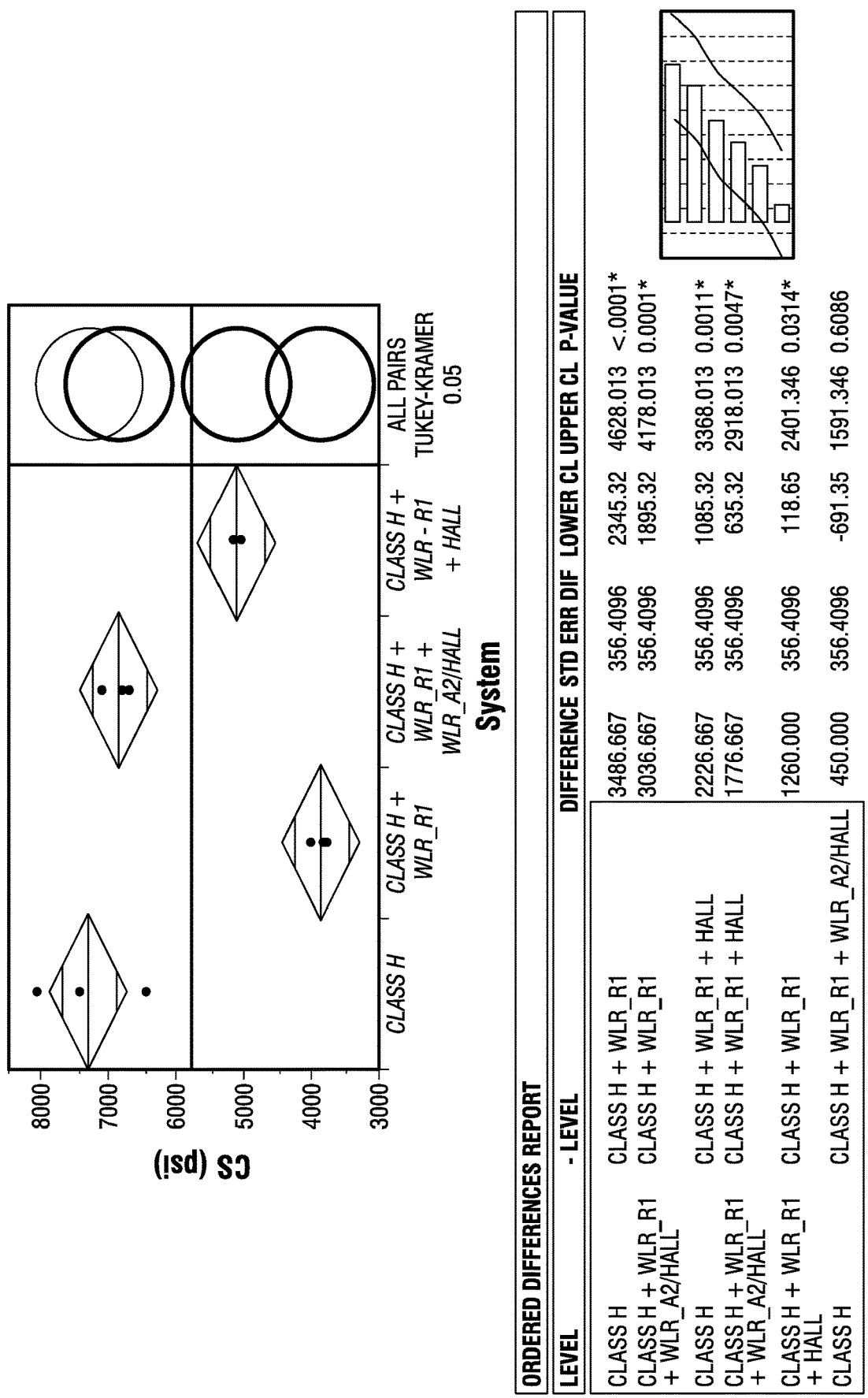
FIG. 10 is a Tukey-Kramer plot of results of a compressive strength test of cement compositions.
Figure 11:
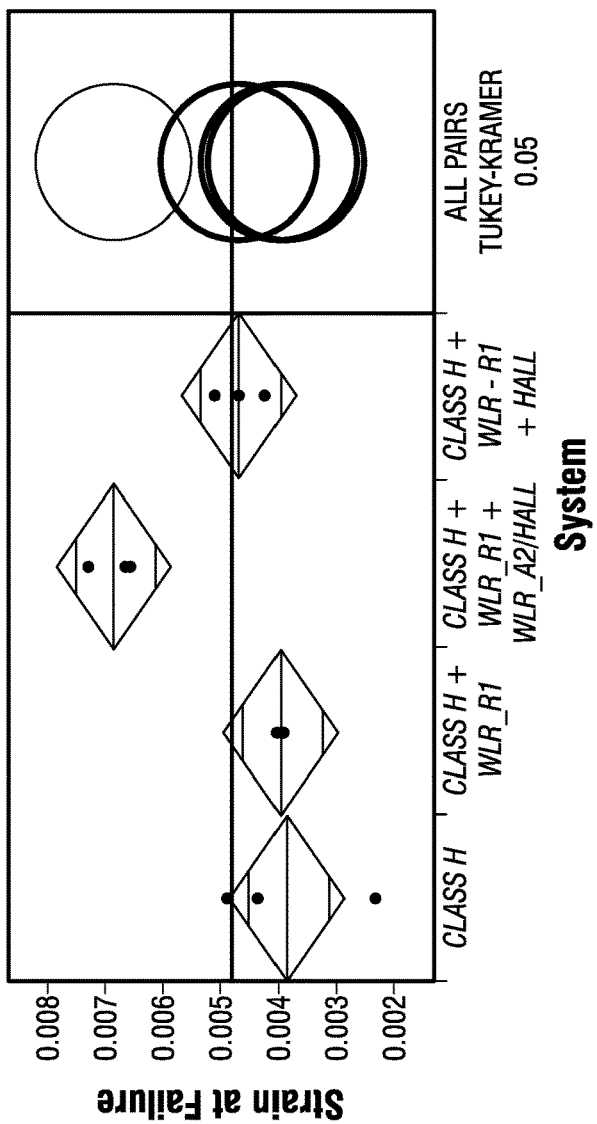
FIG. 11 is a Tukey-Kramer plot of results of a strain at failure test of cement compositions.
Figure 11:
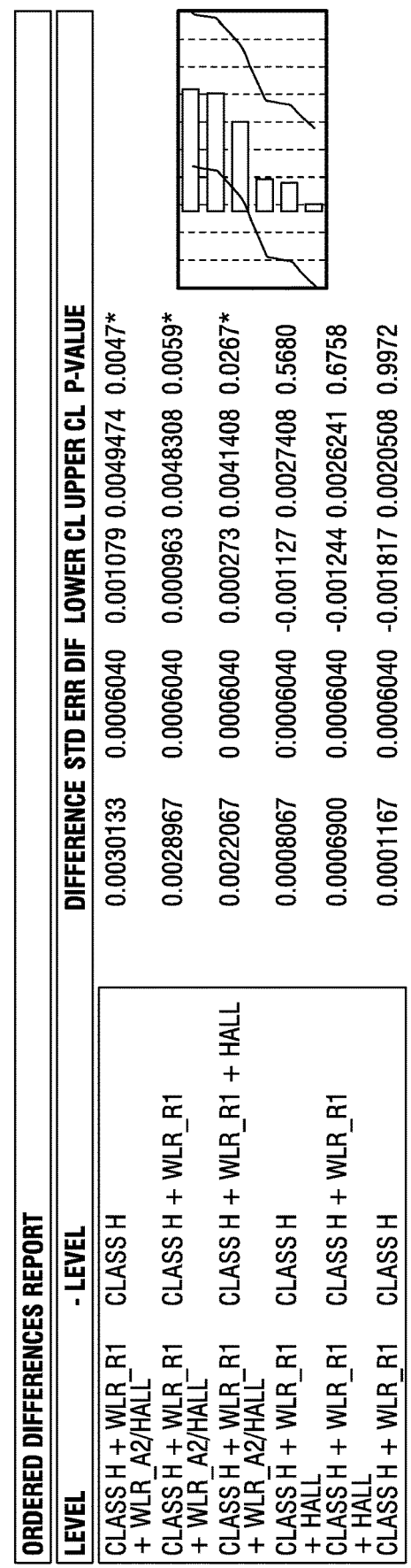

FIGS. 6-8 illustrate methods of remedial or secondary cementing. Turning now to FIG. 6, there is shown a partial cross-section of a conventional producing wellbore 505 that has a primary cemented casing 512. The cement sheath 510 around the casing 512 may have defects potentially caused by a variety of issues, such as improper curing of the cement sheath 510 while it was being formed. Alternatively, the primary cementing may have been successful, but due to adverse temperatures and pressures within the subterranean formation 500, the casing 512 and/or the cement sheath 510 surrounding the casing 512 may form cracks or other types of small perforations 600. The small perforations 600 may be problematic since they may facilitate the introduction of undesirable fluids into the casing 512. As shown in FIG. 6, a small perforation 600 has formed in the cement sheath 510 and the casing 512, potentially allowing the introduction of undesirable fluids into the interior of the casing 512.

Referring now to FIG. 7, a small perforation 600 may be filled or plugged by a resin containing cement composition 420 or a resin-cement composite. A plug 700 (the plug 700 may be any type of plug, e.g., bridge plug, etc.) may be initially placed adjacent and below the small perforation 600, to form a barrier to prevent resin containing cement composition 420 from flowing down the wellbore 505 and therefore allow resin containing cement composition 420 of the present disclosure to fill the small perforations 600 in the casing 512 and cement sheath 510. As shown in FIG. 7, tubing 705 (e.g., coiled tubing, drill pipe, etc.) may be lowered into wellbore 505. A first spacer fluid 518 may be pumped into the wellbore 505 via the tubing 705 and allowed to flow down the interior of the tubing 705 and into the blocked section of the wellbore 505 created by the plug 700. A portion of the first spacer fluid 518 may then flow through the small perforation 600 while another portion may reside in the wellbore annulus 514. After pumping the first spacer fluid 518 through the tubing 705, the resin containing cement composition 420 may be pumped through the tubing 705. The resin containing cement composition 420 may be pumped down the interior of the tubing 705 and into the blocked section of the wellbore 505 created by the plug 700.

A portion of the resin containing cement composition 420 may then flow through the small perforation 600 while another portion may reside in the wellbore annulus 514. The resin containing cement composition 420 may be allowed to set in the small perforation 600 and in a portion of the wellbore annulus 514, for example, to form a hardened mass that seals small perforation 600 to prevent the migration of undesirable fluids into the interior of the casing 512. After the resin containing cement composition 420 has been pumped into the tubing 705, a second spacer fluid 522 may be pumped into the tubing 705 and allowed to flow down the interior of the tubing 705 into the blocked section of the wellbore 505 created by the plug 700 and up around the tubing 705 into the wellbore annulus 514. Alternatively, one or no spacer fluids may be used, and resin containing cement composition 420 may not need to be separated from other fluids introduced previously or subsequently into wellbore 505. The tubing 705 may then be removed. The plug 700 may also be removed. In alternative examples, plug 700 may remain in the wellbore 505 and be drilled through. After tubing 705 is removed, the portion of the hardened resin containing cement composition 420 remaining in the wellbore 505 (i.e., the portion not in the small perforation 600) may then be drilled through.

FIG. 8 describes another example of filling a small perforation 600 with a resin containing cement composition 420. A plug 700 (the plug 700 may be any type of plug, e.g., bridge plug, etc.) may be initially placed adjacent and below the small perforation 600, to form a barrier that may allow pressurized pumping of a resin containing cement composition 420 of the present disclosure to fill any small perforations 600 in the casing 512 and cement sheath 510. As shown in FIG. 8, tubing 705 (e.g., coiled tubing, drill pipe, etc.) may be lowered into wellbore 505. Tubing 705 may be attached to a retainer 800 or may be inserted into a retainer 800 already placed into the wellbore 505. Retainer 800 may allow for the pressurized pumping of the resin containing cement composition 420 into any small perforations 600. Retainer 800 must be placed adjacent to and above the small perforations 600 to be filled by resin containing cement composition 420. Retainer 800 may be any type of retainer, for example, a cement retainer. After plug 700, tubing 705, and retainer 800 are placed, a first spacer fluid 518 may be pumped into the wellbore 505 via the tubing 705 and allowed to flow down the interior of the tubing 705 and into the blocked section of the wellbore 505 created by the plug 700. A portion of the first spacer fluid 518 may then flow through the small perforation 600. After pumping the first spacer fluid 518 through the tubing 705, the resin containing cement composition 420 may be pumped through the tubing 705. The resin containing cement composition 420 may be pumped down the interior of the tubing 705 and into the blocked section of the wellbore 505 created by the plug 700. A portion of the resin containing cement composition 420 may then flow through the small perforation 600 while another portion may reside in the space formed between the plug 700 and retainer 800. The resin containing cement composition 420 may be allowed to set in the small perforation 600 and in the space formed between the plug 700 and retainer 800. The resin containing cement composition 420 may then harden to form a hardened mass that seals small perforation 600 to prevent the migration of undesirable fluids into the interior of the casing 512. After the resin containing cement composition 420 has been pumped into the tubing 705, a second spacer fluid 522 may be pumped into the tubing 705 and allowed to flow down the interior of the tubing 705 into the blocked section of the wellbore 505 created by the plug 700 and into the space formed between the plug 700 and retainer 800. Alternatively, one or no spacer fluids may be used, and resin containing cement composition 420 may not need to be separated from other fluids introduced previously or subsequently into wellbore 505. The tubing 705 may then be removed. The plug 700 may also be removed. In alternative examples, plug 700 may remain in the wellbore 505 and be drilled through. Retainer 800 may also be removed. Conversely, in alternative examples, retainer 800 may be drilled through. After tubing 705 is removed, the portion of the hardened resin containing cement composition 420 remaining in the wellbore 505 (i.e., the portion not in the small perforation 600) may then be drilled through.

The cementing compositions disclosed herein may directly or indirectly affect one or more components or pieces of equipment associated with the preparation, delivery, recapture, recycling, reuse, and/or disposal of the cementing compositions. For example, the cementing compositions may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the cementing compositions. The cementing compositions may also directly or indirectly affect any transport or delivery equipment used to convey the cementing compositions to a well site or downhole such as, for example, any transport vessels, conduits, pipelines, trucks, tubulars, and/or pipes used to compositionally move the cementing compositions from one location to another, any pumps, compressors, or motors (e.g., topside or downhole) used to drive the fracturing fluid into motion, any valves or related joints used to regulate the pressure or flow rate of the cementing compositions, and any sensors (i.e., pressure and temperature), gauges, and/or combinations thereof, and the like. The disclosed cementing compositions may also directly or indirectly affect the various downhole equipment and tools that may come into contact with the cementing compositions such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

The systems and methods may include any of the various features of the systems and methods disclosed herein, including one or more of the following statements.

Statement 1. A method of cementing comprising: providing a bulk dry cement, wherein the bulk dry cement comprises a dry blend of cement and a solid resin accelerator, wherein the solid resin accelerator comprises a liquid resin accelerator on a solid particle; preparing a cement slurry comprising: the bulk dry cement; water; and a liquid hardenable resin component; and introducing the cement slurry into a wellbore.

Statement 2. The method of statement 1 wherein the cement comprises at least one cement selected from the group consisting of Portland cement, pozzolan cement, gypsum cement, high alumina content cement, slag cement, high magnesia content cement, shale cement, acid/base cement, fly ash cement, zeolite cement, kiln dust cement system, microfine cement, metakaolin cement, pumice/lime cement, and combinations thereof.

Statement 3. The method of any one of statements 1 or 2 wherein the liquid hardenable resin component comprises at least one liquid resin selected from the group consisting of epoxy-based resins, novolak resins, polyepoxide resins, phenol-aldehyde resins, urea-aldehyde resins, urethane resins, phenolic resins, furan resins, furan and furfuryl alcohol resins, phenolic/latex resins, phenol formaldehyde resins, bisphenol A diglycidyl ether resins, butoxymethyl butyl glycidyl ether resins, bisphenol A-epichlorohydrin resins, bisphenol F resins, diglycidyl ether bisphenol F resin, cyclohexane dimethanol diglycidyl ether, glycidyl ether resins, polyester resins and hybrids and copolymers thereof, polyurethane resins and hybrids and copolymers thereof, acrylate resins, and combinations thereof and wherein the liquid resin accelerator comprises at least one liquid resin accelerator selected form the group consisting of aliphatic amines, aliphatic tertiary amines, aromatic amines, cycloaliphatic amines, heterocyclic amines, amido amines, polyamides, polyethyl amines, polyether amines, polyoxyalkylene amines, carboxylic anhydrides, triethylenetetraamine, ethylene diamine, N-cocoalkyltrimethylene, isophorone diamine, N-aminophenyl piperazine, imidazoline, 1,2-diaminocyclohexane, polyetheramine, diethyltoluenediamine, 4,4'-diaminodiphenyl methane, methyltetrahydrophthalic anhydride, hexahydrophthalic anhydride, maleic anhydride, polyazelaic polyanhydride, phthalic anhydride, 6-Methyl-2,4-bis(methylthio)phenylene-1,3-diamine; 2-methyl-4,6-bis(methylthio) phenylene-1,3-diamine, 2,4,6-tris(dimethylaminomethyl)phenol, and combinations thereof.

Statement 4. The method of any one of statements 1-3 wherein the liquid resin accelerator comprises 2,4,6-tris (dimethylaminomethyl)phenol, wherein the solid particle comprises halloysite, and wherein the liquid hardenable resin comprises diglycidyl ether of bisphenol A and butyl glycidyl ether.

Statement 5. The method of any one of statements 1-4 wherein the solid particle comprises at least one solid selected from the group consisting of halloysite, halloysite nanotubes, silica dust, silica flour, fumed silica, silica fume, porous silica, cement kiln dust (CKD), Portland cement, calcium silicate, pumice, perlite, metakaolin, kaolinite, natural glasses, synthetic glass, biomass ash, diatomaceous earth, iron oxide, manganese oxide, barite, calcium carbonate, slag and hollow glass spheres.

Statement 6. The method of any one of statements 1-5 wherein the step of preparing comprises: blending the bulk dry cement and the water to form a resin-free cement slurry; and combining the liquid hardenable resin component and the resin-free cement slurry in a pump to form the cement slurry.

Statement 7. The method of any one of statements 1-6 wherein the step of preparing comprises: blending the bulk dry cement, the liquid hardenable resin component and the water in a blender to form the cement slurry.

Statement 8. The method of any one of statements 1-7 wherein the step of preparing comprises: combining the liquid hardenable resin component and the water to form a resin water mixture; and blending the bulk dry cement and the resin water mixture to form the cement slurry.

Statement 9. A bulk dry cement comprising: a cement; and a solid particle; and a liquid resin accelerator, wherein the liquid resin accelerator is disposed on a surface of the solid particle.

Statement 10. The bulk dry cement of statement 9 wherein the liquid resin accelerator comprises at least one liquid resin accelerator selected form the group consisting of aliphatic amines, aliphatic tertiary amines, aromatic amines, cycloaliphatic amines, heterocyclic amines, amido amines, polyamides, polyethyl amines, polyether amines, polyoxyalkylene amines, carboxylic anhydrides, triethylenetetraamine, ethylene diamine, N-cocoalkyltrimethylene, isophorone diamine, N-aminophenyl piperazine, imidazoline, 1,2-diaminocyclohexane, polyetheramine, diethyltoluenediamine, 4,4'-diaminodiphenyl methane, methyltetrahydrophthalic anhydride, hexahydrophthalic anhydride, maleic anhydride, polyazelaic polyanhydride, phthalic anhydride, 6-Methyl-2,4-bis(methylthio)phenylene-1,3-diamine; 2-methyl-4,6-bis(methylthio) phenylene-1,3-diamine, 2,4,6-tris(dimethylaminomethyl)phenol, and combinations thereof.

Statement 11. The bulk dry cement of any of statements 9 or 10 wherein the solid particle comprises at least one solid selected from the group consisting of halloysite, halloysite nanotubes, silica dust, silica flour, fumed silica, silica fume, porous silica, cement kiln dust (CKD), Portland cement, calcium silicate, pumice, perlite, metakaolin, kaolinite, natural glasses, synthetic glass, biomass ash, diatomaceous earth, iron oxide, manganese oxide, barite, calcium carbonate, slag and hollow glass spheres.

Statement 12. The bulk dry cement of any of statements 9-11 wherein the liquid resin accelerator comprises 2,4,6-tris(dimethylaminomethyl)phenol, wherein the solid particle comprises halloysite, and wherein the liquid hardenable resin comprises diglycidyl ether of bisphenol A and butyl glycidyl ether.

Statement 13. The bulk dry cement of any of statements 9-12 wherein the liquid hardenable resin further comprises at least one of cyclohexane dimethanol diglycidyl ether or diglycidyl ether bisphenol F resin.

Statement 14. The bulk dry cement of any of statements 9-13 wherein the cement comprises at least one cement selected from the group consisting of Portland cement, pozzolan cement, gypsum cement, high alumina content cement, slag cement, high magnesia content cement, shale cement, acid/base cement, fly ash cement, zeolite cement, kiln dust cement system, microfine cement, metakaolin cement, pumice/lime cement, and combinations thereof.

Statement 15. A system comprising: a cement blender; a source of water coupled to the cement blender; a source of cement coupled to the cement blender; a pump fluidically coupled to the cement blender and a wellbore; and a liquid additive pump coupled to a source of liquid hardenable resin and at least one of the source of water, the cement blender, or the pump, wherein the source of cement comprises a cement and a solid resin accelerator.

Statement 16. The system of statement 15 wherein the cement comprises at least one cement selected from the group consisting of Portland cement, pozzolan cement, gypsum cement, high alumina content cement, slag cement, high magnesia content cement, shale cement, acid/base cement, fly ash cement, zeolite cement, kiln dust cement system, microfine cement, metakaolin cement, pumice/lime cement, and combinations thereof.

Statement 17. The system of any one of statements 15 or 16 wherein the solid resin accelerator comprises a liquid resin accelerator adsorbed and/or absorbed on a solid particle.

Statement 18. The system of any one of statements 15-17 wherein the liquid resin accelerator comprises at least one liquid resin accelerator selected form the group consisting of aliphatic amines, aliphatic tertiary amines, aromatic amines, cycloaliphatic amines, heterocyclic amines, amido amines, polyamides, polyethyl amines, polyether amines, polyoxyalkylene amines, carboxylic anhydrides, triethylenetetraamine, ethylene diamine, N-cocoalkyltrimethylene, isophorone diamine, N-aminophenyl piperazine, imidazoline, 1,2-diaminocyclohexane, polyetheramine, diethyltoluenediamine, 4,4'-diaminodiphenyl methane, methyltetrahydrophthalic anhydride, hexahydrophthalic anhydride, maleic anhydride, polyazelaic polyanhydride, phthalic anhydride, 6-Methyl-2,4-bis(methylthio)phenylene-1,3-diamine; 2-methyl-4,6-bis(methylthio) phenylene-1,3-diamine, 2,4,6-tris(dimethylaminomethyl)phenol, and combinations thereof.

Statement 19. The system of any one of statements 15-18 wherein the solid particle comprises at least one solid selected from the group consisting of halloysite, halloysite nanotubes, silica dust, silica flour, fumed silica, silica fume, porous silica, cement kiln dust (CKD), Portland cement, calcium silicate, pumice, perlite, metakaolin, kaolinite, natural glasses, synthetic glass, biomass ash, diatomaceous earth, iron oxide, manganese oxide, barite, calcium carbonate, slag and hollow glass spheres.

Statement 20. The system of any one of statements 15-19 further comprising a control system configured to control the liquid additive pump.

EXAMPLE

The following examples are exemplary of the disclosed cement compositions and should not be read to limit or define the scope of the disclosure.

A solid accelerator was prepared by disposing 81.1 grams of 2, 4, 6-tris(dimethylaminomethyl)phenol on the surface of 250 grams of halloysite. The halloysite was placed in a Hobart mixer, and then the 2, 4, 6-tris(dimethylaminomethyl)phenol was added. The components were mixed until a free flowing powder was observed. Four cement compositions were prepared, and data was collected on Young's modulus, compressive strength, and strain at fail for each cement composition. Cement compositions are provided in Table 1, and the raw data is tabulated in Table 2 below. Four compositions were prepared for each system, neat class H Portland cement with diutan as a suspension aid; class H Portland cement and a resin mixture of diglycidyl ether of bisphenol A and butyl glycidyl ether; class H Portland cement, a resin mixture of diglycidyl ether of bisphenol A and butyl glycidyl ether, and 2, 4, 6-tris(dimethylaminomethyl)phenol disposed on halloysite; and class H Portland cement, a resin mixture of diglycidyl ether of bisphenol A and butyl glycidyl ether, and halloysite.

TABLE 1

| Component | Class H | Class H + Resin | Class H + Resin + Hall. Accel. | Class H + Resin + Hall. |
|---|---|---|---|---|
| Class H Cement | 860 g | 688 g | 688 g | 688 g |
| Water | 327 g | 261.6 g | 261.6 g | 261.6 g |

TABLE 1-continued

| Component | Class H | Class H + Resin | Class H + Resin + Hall. Accel. | Class H + Resin + Hall. |
|---|---|---|---|---|
| Resin mixture | — | 120 mL | 120 mL | 120 mL |
| Solid accelerator | — | — | 12.2 g | — |
| Halloysite | — | — | — | 9.2 g |
| Diutan | 0.25 g | — | — | — |

TABLE 2

| System | YM (psi) | CS (psi) | Strain at Fail |
|---|---|---|---|
| Class H | 2.21E+06 | 7.38E+03 | 4.84E−03 |
| Class H | 2.24E+06 | 6.38E+03 | 2.26E−03 |
| Class H | 2.42E+06 | 8.04E+03 | 4.30E−03 |
| Class H + Resin | 1.21E+06 | 3.69E+03 | 3.85E−03 |
| Class H + Resin | 1.14E+06 | 3.74E+03 | 3.98E−03 |
| Class H + Resin | 1.14E+06 | 3.91E+03 | 3.92E−03 |
| Class H + Resin + Hall. Accel. | 1.70E+06 | 6.74E+03 | 6.64E−03 |
| Class H + Resin + Hall. Accel. | 1.36E+06 | 6.64E+03 | 6.54E−03 |
| Class H + Resin + Hall. Accel. | 1.68E+06 | 7.06E+03 | 7.26E−03 |
| Class H + Resin + Hall. | 1.44E+06 | 5.06E+03 | 4.18E−03 |
| Class H + Resin + Hall. | 1.29E+06 | 5.09E+03 | 4.61E−03 |
| Class H + Resin + Hall. | 1.61E+06 | 4.97E+03 | 5.03E−03 |

It was observed that each cement composition comprising resin exhibited a statistically significant reduction in Young's modulus in comparison to neat class H cement compositions. Only the cement compositions containing halloysite coated with resin accelerator maintained compressive strength with a reduction in Young's modulus compared to neat class H cement. In addition, the system containing the halloysite coated with resin accelerator exhibited statistically significant higher strain at fail in comparison to all other samples. The It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Although individual embodiments are discussed, the disclosure covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

What is claimed is:

1. A method of cementing comprising:
providing a bulk dry cement, wherein the bulk dry cement comprises a dry blend of cement and a solid resin accelerator, wherein the solid resin accelerator comprises a liquid resin accelerator on a solid particle;
preparing a cement slurry comprising:
the bulk dry cement;
water; and
a liquid hardenable resin component;
introducing the cement slurry into a wellbore;
hardening the cement by reacting the cement with water; and
hardening the liquid hardenable resin component by reacting with the liquid resin accelerator.

2. The method of claim 1 wherein the cement comprises at least one cement selected from the group consisting of Portland cement, pozzolan cement, gypsum cement, alumina cement, slag cement, high magnesia content cement, shale cement, acid/base cement, fly ash cement, zeolite cement, kiln dust cement system, metakaolin cement, pumice/lime cement, and combinations thereof.

3. The method of claim 1 wherein the liquid hardenable resin component comprises at least one liquid resin selected from the group consisting of epoxy-based resins, novolak resins, polyepoxide resins, phenol-aldehyde resins, urea-aldehyde resins, urethane resins, phenolic resins, furan resins, furan and furfuryl alcohol resins, phenolic/latex resins, phenol formaldehyde resins, bisphenol A diglycidyl ether resins, butoxymethyl butyl glycidyl ether resins, bisphenol A-epichlorohydrin resins, bisphenol F resins, diglycidyl ether bisphenol F resin, cyclohexane dimethanol diglycidyl ether, glycidyl ether resins, polyester resins and hybrids and copolymers thereof, polyurethane resins and hybrids and copolymers thereof, acrylate resins, and combinations thereof and wherein the liquid resin accelerator comprises at least one liquid resin accelerator selected form the group consisting of aliphatic amines, aliphatic tertiary amines, aromatic amines, cycloaliphatic amines, heterocyclic amines, amido amines, polyamides, polyethyl amines, polyether amines, polyoxyalkylene amines, carboxylic anhydrides, triethylenetetraamine, ethylene diamine, N-cocoalkyltrimethylene, isophorone diamine, N-aminophenyl piperazine, imidazoline, 1,2-diaminocyclohexane, polyetheramine, diethyltoluenediamine, 4,4'-diaminodiphenyl methane, methyltetrahydrophthalic anhydride, hexahydrophthalic anhydride, maleic anhydride, polyazelaic polyanhydride, phthalic anhydride, 6-Methyl-2,4-bis(methylthio)phenylene-1,3-diamine; 2-methyl-4,6-bis(methylthio) phenylene-1,3-diamine, 2,4,6-tris(dimethylaminomethyl)phenol, and combinations thereof.

4. The method of claim 1 wherein the liquid resin accelerator comprises 2,4,6-tris(dimethylaminomethyl)phenol, wherein the solid particle comprises halloysite, and wherein the liquid hardenable resin comprises diglycidyl ether of bisphenol A and butyl glycidyl ether.

5. The method of claim 1 wherein the solid particle comprises at least one solid selected from the group consisting of halloysite, halloysite nanotubes, silica dust, silica flour, fumed silica, silica fume, porous silica, cement kiln dust (CKD), Portland cement, calcium silicate, pumice, perlite, metakaolin, kaolinite, natural glasses, synthetic glass, biomass ash, diatomaceous earth, iron oxide, manganese oxide, barite, calcium carbonate, slag and hollow glass spheres.

6. The method of claim 1 wherein the step of preparing comprises:
blending the bulk dry cement and the water to form a resin-free cement slurry; and
combining the liquid hardenable resin component and the resin-free cement slurry in a pump to form the cement slurry.

7. The method of claim 1 wherein the step of preparing comprises:
blending the bulk dry cement, the liquid hardenable resin component and the water in a blender to form the cement slurry.

8. The method of claim 1 wherein the step of preparing comprises:
combining the liquid hardenable resin component and the water to form a resin water mixture; and
blending the bulk dry cement and the resin water mixture to form the cement slurry.

9. The method of claim 1, wherein the solid resin accelerator is present in an amount of 0.1 vol. % to 10 vol. % of the cement slurry.

10. A system comprising:
a cement blender;
a source of water coupled to the cement blender;
a source of cement coupled to the cement blender;
a pump fluidically coupled to the cement blender and a wellbore; and
a liquid additive pump coupled to a source of liquid hardenable resin and at least one of the source of water, the cement blender, or the pump,
wherein the source of cement comprises bulk dry cement comprising a dry blend of cement and a solid resin accelerator, wherein the solid resin accelerator comprises a liquid resin accelerator on a solid particle.

11. The system of claim 10 wherein the cement comprises at least one cement selected from the group consisting of Portland cement, pozzolan cement, gypsum cement, alumina cement, slag cement, high magnesia content cement, shale cement, acid/base cement, fly ash cement, zeolite cement, kiln dust cement system, metakaolin cement, pumice/lime cement, and combinations thereof.

12. The system of claim 10 wherein the solid resin accelerator comprises a liquid resin accelerator adsorbed and/or absorbed on the solid particle.

13. The system of claim 12 wherein the liquid resin accelerator comprises at least one liquid resin accelerator selected form the group consisting of aliphatic amines, aliphatic tertiary amines, aromatic amines, cycloaliphatic amines, heterocyclic amines, amido amines, polyamides, polyethyl amines, polyether amines, polyoxyalkylene amines, carboxylic anhydrides, triethylenetetraamine, ethylene diamine, N-cocoalkyltrimethylene, isophorone diamine, N-aminophenyl piperazine, imidazoline, 1,2-diaminocyclohexane, polyetheramine, diethyltoluenediamine, 4,4'-diaminodiphenyl methane, methyltetrahydrophthalic anhydride, hexahydrophthalic anhydride, maleic anhydride, polyazelaic polyanhydride, phthalic anhydride, 6-Methyl-2,4-bis(methylthio)phenylene-1,3-diamine; 2-methyl-4,6-bis(methylthio) phenylene-1,3-diamine, 2,4,6-tris(dimethylaminomethyl)phenol, and combinations thereof.

14. The system of claim 12 wherein the solid particle comprises at least one solid selected from the group consisting of halloysite, halloysite nanotubes, silica dust, silica flour, fumed silica, silica fume, porous silica, cement kiln dust (CKD), Portland cement, calcium silicate, pumice, perlite, metakaolin, kaolinite, natural glasses, synthetic glass, biomass ash, diatomaceous earth, iron oxide, manganese oxide, barite, calcium carbonate, slag and hollow glass spheres.

15. The system of claim 10 further comprising a control system configured to control the liquid additive pump.

16. A method of cementing comprising:
providing a bulk dry cement, wherein the bulk dry cement comprises a dry blend of cement and a solid resin accelerator, wherein the solid resin accelerator comprises a liquid resin accelerator on a solid particle, and wherein the solid resin accelerator is capable of reacting with a liquid hardenable resin component to form a solid mass;
preparing a cement slurry comprising:
the bulk dry cement; and
water;
pumping the cement slurry using a pump while introducing the liquid hardenable resin component into a suction header on the pump, thereby mixing the cement slurry and the liquid hardenable resin component to form a resin containing cement slurry; and
introducing the resin containing cement slurry into a wellbore, and reacting the liquid resin accelerator with the liquid hardenable resin component to form a solid mass.

17. The method of claim 16 wherein the cement comprises at least one cement selected from the group consisting of Portland cement, pozzolan cement, gypsum cement, alumina cement, slag cement, high magnesia content cement, shale cement, acid/base cement, fly ash cement, zeolite cement, kiln dust cement system, metakaolin cement, pumice/lime cement, and combinations thereof.

18. The method of claim 16 wherein the liquid hardenable resin component comprises at least one liquid resin selected from the group consisting of epoxy-based resins, novolak resins, polyepoxide resins, phenol-aldehyde resins, urea-aldehyde resins, urethane resins, phenolic resins, furan resins, furan and furfuryl alcohol resins, phenolic/latex resins, phenol formaldehyde resins, bisphenol A diglycidyl ether resins, butoxymethyl butyl glycidyl ether resins, bisphenol A-epichlorohydrin resins, bisphenol F resins, diglycidyl ether bisphenol F resin, cyclohexane dimethanol diglycidyl ether, glycidyl ether resins, polyester resins and hybrids and copolymers thereof, polyurethane resins and hybrids and copolymers thereof, acrylate resins, and combinations thereof and wherein the liquid resin accelerator comprises at least one liquid resin accelerator selected form the group consisting of aliphatic amines, aliphatic tertiary amines, aromatic amines, cycloaliphatic amines, heterocyclic amines, amido amines, polyamides, polyethyl amines, polyether amines, polyoxyalkylene amines, carboxylic anhydrides, triethylenetetraamine, ethylene diamine, N-cocoalkyltrimethylene, isophorone diamine, N-aminophenyl piperazine, imidazoline, 1,2-diaminocyclohexane, polyetheramine, diethyltoluenediamine, 4,4'-diaminodiphenyl methane, methyltetrahydrophthalic anhydride, hexahydrophthalic anhydride, maleic anhydride, polyazelaic polyanhydride, phthalic anhydride, 6-Methyl-2,4-bis(methylthio)phenylene-1,3-diamine; 2-methyl-4,6-bis(methylthio) phenylene-1,3-diamine, 2,4,6-tris(dimethylaminomethyl)phenol, and combinations thereof.

19. The method of claim 16 wherein the liquid resin accelerator comprises 2,4,6-tris(dimethylaminomethyl)phenol, wherein the solid particle comprises halloysite, and wherein the liquid hardenable resin comprises diglycidyl ether of bisphenol A and butyl glycidyl ether.

20. The method of claim 16 wherein the solid particle comprises at least one solid selected from the group consisting of halloysite, halloysite nanotubes, silica dust, silica flour, fumed silica, silica fume, porous silica, cement kiln dust (CKD), Portland cement, calcium silicate, pumice, perlite, metakaolin, kaolinite, natural glasses, synthetic glass, biomass ash, diatomaceous earth, iron oxide, manganese oxide, barite, calcium carbonate, slag and hollow glass spheres.

* * * * *